US012619073B2

(12) United States Patent
    Kobayashi

(10) Patent No.: US 12,619,073 B2
(45) Date of Patent: May 5, 2026

(54) CONTROL DEVICE, CONTROL METHOD FOR HEAD-MOUNTED DISPLAY DEVICE, AND PROGRAM

(71) Applicant: SEIKO EPSON CORPORATION, Tokyo (JP)

(72) Inventor: Shinichi Kobayashi, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 350 days.

(21) Appl. No.: 18/223,832

(22) Filed: Jul. 19, 2023

(65) Prior Publication Data

US 2024/0027765 A1      Jan. 25, 2024

(30) Foreign Application Priority Data

Jul. 20, 2022    (JP) ................................. 2022-115363

(51) Int. Cl.
    *G02B 27/01*        (2006.01)
    *G06F 3/048*        (2013.01)

(52) U.S. Cl.
    CPC ....... *G02B 27/017* (2013.01); *G02B 27/0179* (2013.01); *G06F 3/048* (2013.01); *G02B 2027/0138* (2013.01); *G02B 2027/014* (2013.01); *G02B 2027/0178* (2013.01); *G02B 2027/0181* (2013.01); *G02B 2027/0187* (2013.01); *G02B 2027/0198* (2013.01)

(58) Field of Classification Search
    CPC .............. G02B 27/0093; G02B 27/017; G02B 27/0179; G02B 2027/0138; G02B 2027/014; G02B 2027/0178; G02B 2027/0181; G02B 2027/0187; G02B 2027/0198; G06F 3/048

See application file for complete search history.

(56) References Cited

U.S. PATENT DOCUMENTS

| | | | |
|---|---|---|---|
| 2015/0381885 A1* | 12/2015 | Kim ........................ | G06F 3/017 348/207.1 |
| 2016/0026253 A1* | 1/2016 | Bradski ................ | H04N 13/128 345/8 |
| 2017/0123824 A1* | 5/2017 | Franck .................... | G06F 9/453 |
| 2021/0239988 A1 | 8/2021 | Kobayashi | |

FOREIGN PATENT DOCUMENTS

JP            2021-119364 A        8/2021

* cited by examiner

*Primary Examiner* — Cory A Almeida
(74) *Attorney, Agent, or Firm* — Oliff PLC

(57)              ABSTRACT

A control device includes a determination unit that determines an image visually recognized by a user among a plurality of images displayed by an image display unit based on at least one of the line of sight of the user and the orientation of the head of the user, a setting unit that sets, as a first image, an image having the highest number of determination times that an image has been determined as an image visually recognized by the user among the plurality of images displayed by the image display unit, and sets, as a second image, an image having the second highest number of determination times after the first image, and a display control unit that changes a display position of the second image so that a display distance between the first image and the second image being displayed becomes shorter than a preset distance.

11 Claims, 13 Drawing Sheets

CONTROL DEVICE, CONTROL METHOD FOR HEAD-MOUNTED DISPLAY DEVICE, AND PROGRAM

The present application is based on, and claims priority from JP Application Serial Number 2022-115363, filed Jul. 20, 2022, the disclosure of which is hereby incorporated by reference herein in its entirety.

BACKGROUND

1. Technical Field

The present disclosure relates to a control device, a control method for a head-mounted display device, and a program.

2. Related Art

In the related art, a technology for a head-mounted display device which is designed to be mounted on the head of a user U and includes a display unit that displays images of outside views to be visually recognized is known. The technology allows images displayed by the display unit to change according to movement of the head of the user U.

JP-A-2021-119364 is about a head-mounted display device that allows outside views to be visually recognized and includes a display control unit that controls display of an image display unit. The display control unit controls the display of the image display unit in a first mode when the movement of the head of the user U is a movement in a first direction by a value exceeding a first predetermined threshold and in a second mode when the movement of the head of the user U is a movement in a second direction by a value exceeding a second predetermined threshold.

However, the head of the user needs to be moved to switch the mode of display, and thus a technique capable of changing an image displayed by the display unit to be displayed in accordance with the state of the display unit being used has been demanded.

SUMMARY

The present disclosure is about a control device configured to control a head-mounted display device mounted on the head of a user and including a display unit configured to display an image of an outside view so as to be visually recognized, the control device including a first detection unit configured to detect a direction of a line of sight of the user, a second detection unit configured to detect an orientation of the head of the user, a determination unit configured to determine, based on at least one of the line of sight of the user or the orientation of the head of the user, an image visually recognized by the user from among a plurality of images displayed by the display unit, a setting unit configured to set, as a first image, an image with the highest number of times determined by the determination unit to be the image visually recognized by the user among a plurality of the images displayed by the display unit, and set, as a second image, an image with the second highest number of times determined by the determination unit to be the image visually recognized by the user after the first image, and a display control unit configured to change a display position of the second image so that a display distance that is a distance on the display between the first image and the second image is smaller than a preset distance.

The present disclosure is about a control method for a head-mounted display device that is mounted on the head of a user and includes a display unit configured to display an image of an outside view so as to be visually recognized, the control method including a first step of detecting a direction of a line of sight of the user, a second step of detecting an orientation of the head of the user, a third step of determining, based on at least one of the line of sight of the user or the orientation of the head of the user, an image visually recognized by the user from among a plurality of images displayed by the display unit, a fourth step of setting, as a first image, an image with the highest number of times determined in the third step to be the image visually recognized by the user among a plurality of the images displayed by the display unit, and setting, as a second image, an image with the second highest number of times determined in the third step to be the image visually recognized by the user after the first image, and a fifth step of changing a display position of the second image so that a display distance that is a distance on the display between the first image and the second image is smaller than a preset distance.

The present disclosure is about a non-transitory computer-readable storage medium storing a program executed by a computer mounted in a control device, the control device being configured to control a head-mounted display device mounted on the head of a user and including a display unit configured to display an image of an outside view to be visually recognized, the program causing the computer to perform a first procedure of detecting a direction of a line of sight of the user, a second procedure of detecting an orientation of the head of the user, a third procedure of determining, based on at least one of the line of sight of the user or the orientation of the head of the user, an image visually recognized by the user from among a plurality of images displayed by the display unit, a fourth procedure of setting, as a first image, an image with the highest number of times determined in the third step to be the image visually recognized by the user among a plurality of the images displayed by the display unit, and setting, as a second image, an image with the second highest number of times determined in the third step to be the image visually recognized by the user after the first image, and a fifth procedure of changing a display position of the second image so that a display distance that is a distance on the display between the first image and the second image is smaller than a preset distance.

DESCRIPTION OF EXEMPLARY EMBODIMENTS

1. Configuration of Display System

Figure 1:
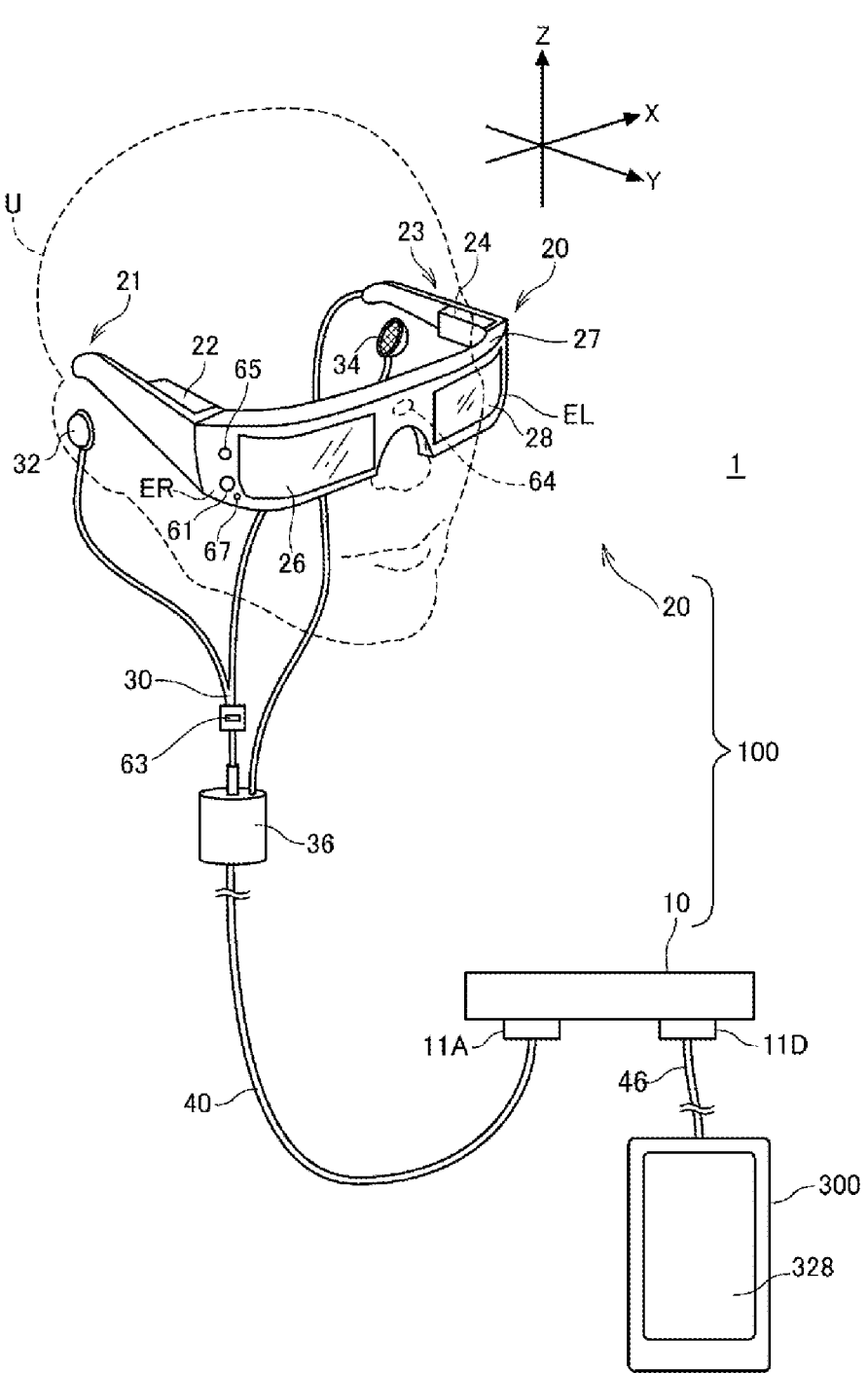
FIG. 1 is a diagram illustrating an overall configuration of a display system.

FIG. 1 is a diagram illustrating an overall configuration of a display system 1.

The display system 1 includes an HMD 100 which is a head-mounted display device and a control device 300. The HMD 100 is a head-mounted display device including an image display unit 20 worn in the head of a user U to allow the user U to visually recognize images and videos. HMD is an abbreviation for Head-Mounted Display. The image display unit 20 corresponds to a display unit.

The X axis, the Y axis, and the Z axis illustrated in FIG. 1 are respective three axis directions orthogonal to each other, the Z axis direction corresponds to a vertical direction, the X axis direction corresponds to the left-right direction of the head of the user U, and the Y axis direction corresponds to the front-rear direction of the head of the user U.

The HMD 100 includes a coupling device 10 coupled to the image display unit 20. The coupling device 10 functions as an interface for coupling the HMD 100 to a device other than the HMD 100. In the display system 1, the control device 300 is coupled to the coupling device 10.

For the sake of easier description, the names of some functional units constituting the HMD 100 are prefixed with DP, and the names of some functional units constituting the control device 300 are prefixed with CO in the following description and drawings.

The control device 300 includes a portable-sized terminal device including a display screen on which characters and images are displayed and a touch panel 323 that functions as an operation unit that senses touch operations and pressing operations, and a smartphone, for example, can be used as the control device. The control device 300 may be a desktop-type personal computer, a notebook-type personal computer, a tablet-type personal computer, or the like.

The coupling device 10 includes a connector 11A and a connector 11D in a box-shaped case. The image display unit 20 is coupled to the connector 11A via a coupling cable 40, and the control device 300 is coupled to the connector 11D via a USB cable 46. This configuration allows the image display unit 20 and the control device 300 to be connected to transmit and receive data to and from each other. The control device 300 outputs, for example, image data for the image display unit 20 to display images and audio data to the image display unit 20. The image display unit 20, for example, transmits sensor data of various sensors included in the image display unit 20 to the control device 300 as will be described below. The control device 300 may be capable of supplying power to the image display unit 20. USB is an abbreviation for Universal Serial Bus.

The configuration in which the coupling device 10 and the control device 300 are coupled to each other using the USB cable 46 is merely an example, and a form of coupling of the coupling device 10 and the control device 300 is not specifically limited. For example, the devices may be connected by wire using other types of cables, or connected through wireless communication. For example, in a configuration in which the USB cable 46 is coupled to the connector 11D of the USB-TypeC standard, the USB cable 46 can supply a 20-volt direct current, and image data and the like of the HDMI standard can be transmitted as a function of the alternative mode of the USB-TypeC. HDMI is a registered trademark.

The image display unit 20 includes a main body including a right holding part 21, a left holding part 23, and a front frame 27. The main body further includes a right display part 22, a left display part 24, a right light-guiding plate 26, and a left light-guiding plate 28.

The right holding part 21 and the left holding part 23 extend rearward from both ends of the front frame 27 to hold the image display unit 20 around the head of the user U. The right holding part 21 is coupled to an end ER located on the right side of the user U in the front frame 27, and the left holding part 23 is coupled to an end EL located on the left side of the user U.

The right light-guiding plate 26 and the left light-guiding plate 28 are provided on the front frame 27. The right light-guiding plate 26 is located in front of the right eye of the user U while the user wears the image display unit 20, and helps the user visually recognize images with his or her right eye. The left light-guiding plate 28 is located in front of the left eye of the user U while the user wears the image display unit 20, and helps the user visually recognize images with his or her left eye. The right light-guiding plate 26 and the left light-guiding plate 28 are optical parts formed of a light transmissive resin or the like, and are configured to guide image light output by the right display part 22 and the left display part 24 to the eyes of the user U. The right light-guiding plate 26 and the left light-guiding plate 28 are, for example, prisms.

The front frame 27 has a shape in which an end of the right light-guiding plate 26 is coupled to an end of the left light-guiding plate 28, and this coupling position corresponds to a position between the eyebrows of the user U while the user U wears the image display unit 20. The front frame 27 may include a nose pad part that comes into contact with the nose of the user U while the user wears the image display unit 20, or may be configured such that a belt is coupled to the right holding part 21 and the left holding part 23 and the image display unit 20 is held around the head of the user U by the belt.

Each of the right display part 22 and the left display part 24 is a module obtained by making an optical unit and a peripheral circuit as a unit. The right display part 22 causes the right light-guiding plate 26 to display an image, and the left display part 24 causes the left light-guiding plate 28 to display an image. The right display part 22 is provided in the right holding part 21, and the left display part 24 is provided in the left holding part 23.

Image light guided by the right light-guiding plate 26 and outside light transmitted through the right light-guiding plate 26 are incident on the right eye of the user U.

Similarly, image light guided by the left light-guiding plate 28 and outside light transmitted through the left light-guiding plate 28 are incident on the left eye of the user. Image light from the right light-guiding plate 26 and the left light-guiding plate 28 and outside light transmitted through the right light-guiding plate 26 and the left light-guiding plate 28 are incident on the eyes of the user U. Accordingly, the user U visually recognizes the image displayed by the image display unit 20 and the outside view transmitted through the right light-guiding plate 26 and the left light-guiding plate 28 in an overlapping manner.

A DP illuminance sensor 65 is disposed on the front frame 27. The DP illuminance sensor 65 is a sensor configured to receive outside light coming from the front side of the user U wearing the image display unit 20. The DP illuminance sensor can detect the illuminance and the light amount of outside light transmitted through the right light-guiding plate 26 and the left light-guiding plate 28 and incident on the eyes of the user U.

A DP outer camera 61 is provided at a position on the front frame 27 at which the DP outer camera does not block outside light transmitted through the right light-guiding plate 26 and the left light-guiding plate 28. The DP outer camera 61 is a digital camera including an image sensor such as a CCD or a CMOS, an imaging lens, and the like, and may be a monocular camera or a stereo camera. The angle of view of the DP outer camera 61 includes at least part of the range of an outside view visually recognized by the user U wearing the image display unit through the right light-guiding plate 26 and the left light-guiding plate 28. The DP outer camera 61 may be a wide-angle camera and may be capable of imaging an entire outside view visually recognized by the user U wearing the image display unit 20. CCD is an abbreviation for Charge Coupled Device, and CMOS is an abbreviation for Complementary Metal Oxide Semiconductor.

An LED indicator 67 that is lit during operations of the DP outer camera 61 is disposed on the front frame 27.

A distance sensor 64 that detects a distance to a measurement target located in a predetermined measurement direction is provided on the front frame 27. The distance sensor 64 is, for example, a light reflection-type distance sensor using an LED, a laser diode, or the like, an infrared-type depth sensor, an ultrasonic-type distance sensor, or a laser range scanner. The distance sensor 64 may be a distance detection unit in which image detection and audio detection are combined, or a device that processes an image obtained by stereo imaging by a camera to detect a distance. The measurement direction of the distance sensor 64 is, for example, a direction of an outside view visually recognized by the user U through the right light-guiding plate 26 and the left light-guiding plate 28.

Each of the right display part 22 and the left display part 24 is coupled to the coupling device 10 by the coupling cable 40. The coupling cable 40 includes an audio connector 36. A headset 30 including a right earphone 32 and a left earphone 34 constituting a stereo headphone, and a microphone 62 is coupled to the audio connector 36. The right earphone 32 and the left earphone 34 output sound based on audio signals output from the coupling device 10. The microphone 62 collects sound and outputs the audio signal to the coupling device 10.

2. Configuration of Optical System of Image Display Unit

Figure 2:
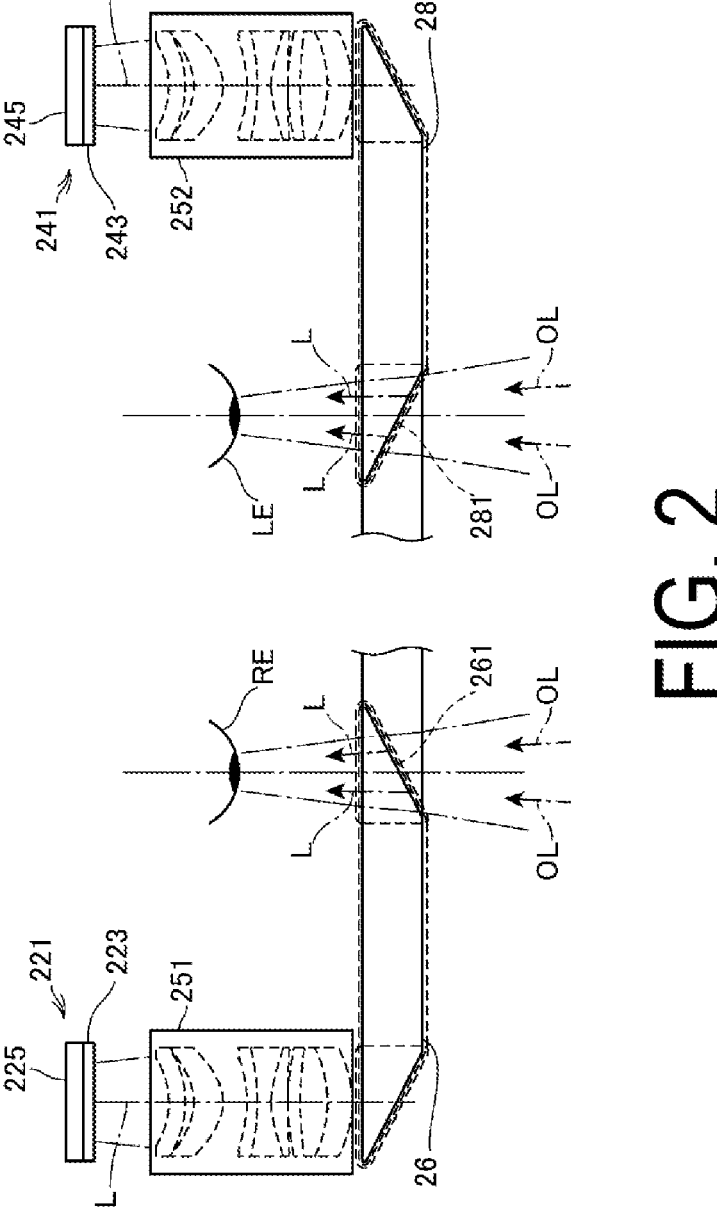
FIG. 2 is a plan view of main parts illustrating a configuration of an optical system of an image display unit.

FIG. 2 is a plan view of main parts illustrating of a configuration of an optical system of the image display unit 20. In FIG. 2, the left eye LE and the right eye RE of the user U are illustrated for explanation.

The right display part 22 and the left display part 24 are disposed to be symmetric in the left-right direction.

The right display part 22 includes an OLED unit 221 configured to emit image light and a right optical system 251 configured to guide image light L emitted by the OLED unit 221 to the right light-guiding plate 26 as a configuration in which the right eye RE of the user is enabled to visually recognize images. OLED is an abbreviation for Organic Light Emitting Diode.

Figure 3:
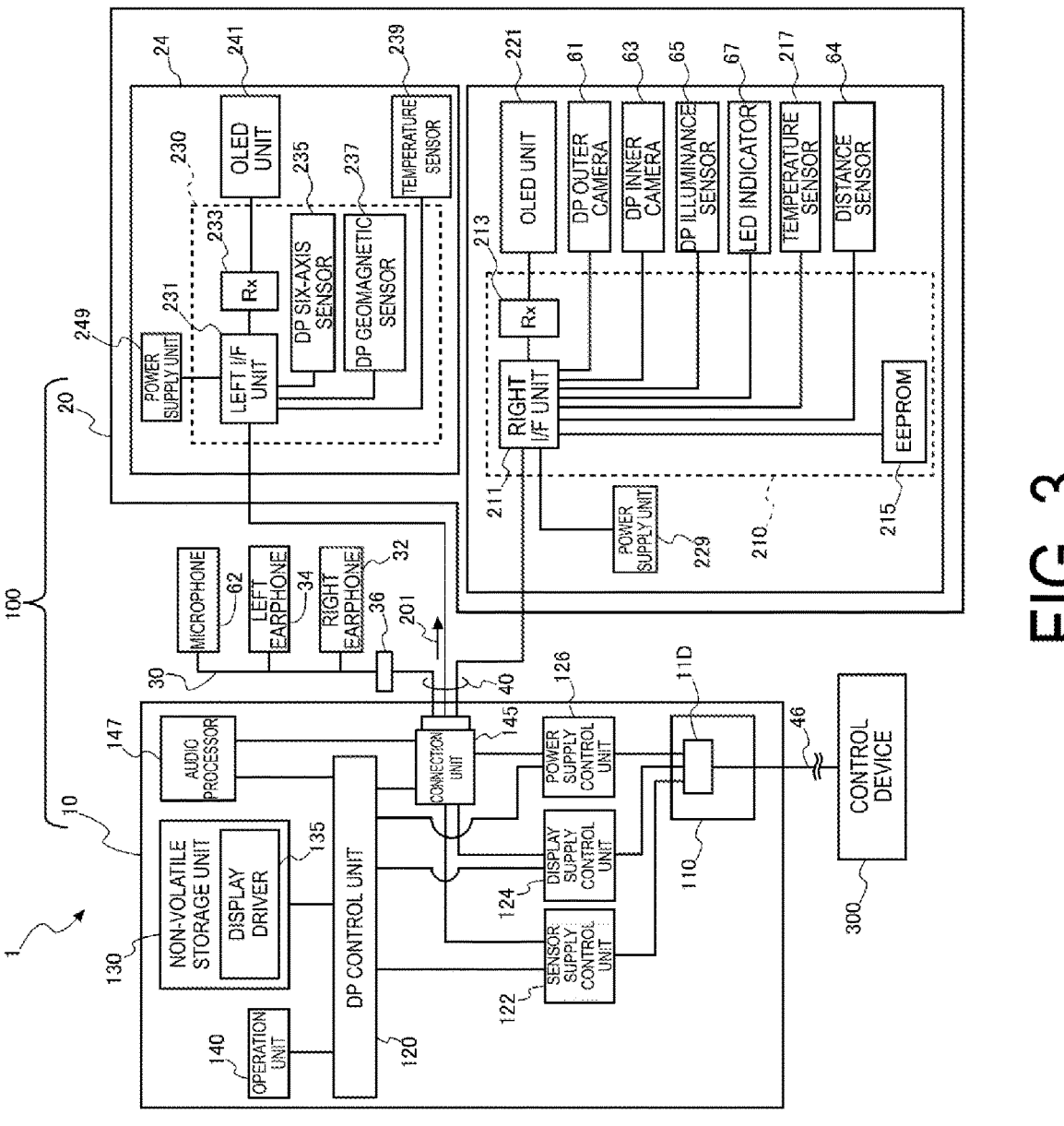
FIG. 3 is a block diagram illustrating a configuration of an HMD.

The OLED unit 221 includes an OLED panel 223, and an OLED drive circuit 225 configured to drive the OLED panel 223. The OLED panel 223 is a self-luminous display panel in which light-emitting elements configured to emit red (R), green (G), and blue (B) light are disposed. The OLED drive circuit 225 drives the OLED panel 223 following the control of a DP control unit 120. The OLED drive circuit 225 is mounted on, for example, a substrate, which is not illustrated, fixed to the back surface of the OLED panel 223, and a temperature sensor 217 illustrated in FIG. 3 is mounted on the substrate.

The right optical system 251 uses a collimate lens to collimate image light L emitted from the OLED panel 223 and cause the light to be incident on the right light-guiding plate 26. The image light L is reflected by a plurality of reflection surfaces inside the right light-guiding plate 26, reflected by a half mirror 261 positioned in front of the right eye RE, and emitted from the right light-guiding plate 26 toward the right eye RE.

The right display part 22 includes an OLED unit 241 configured to emit image light and a left optical system 252 configured to guide image light L emitted by the OLED unit 241 to the left light-guiding plate 28 as a configuration in which the left eye LE of the user is enabled to visually recognize images.

The OLED unit 241 includes an OLED panel 243 and an OLED drive circuit 245 configured to drive the OLED panel 243. The OLED panel 243 is, for example, a self-luminous display panel in which light-emitting elements configured to emit red (R), green (G), and blue (B) light are disposed. The OLED drive circuit 245 drives the OLED panel 243 following the control of the DP control unit 120. The OLED drive circuit 245 is mounted on, for example, a substrate, which is not illustrated, fixed to the back surface of the OLED panel 243, and a temperature sensor 239 illustrated in FIG. 3 is mounted on the substrate.

The left optical system 252 uses a collimate lens to collimate image light L emitted from the OLED panel 243 and cause the light to be incident on the left light-guiding plate 28. The image light L is reflected by a plurality of reflection surfaces inside the left light-guiding plate 28, reflected by a half mirror 281 positioned in front of the left eye LE, and emitted from the left light-guiding plate 28 toward the left eye LE.

The HMD 100 functions as a transmissive-type display device. Namely, the image light L reflected by the half mirror 261 and outside light OL transmitted through the half mirror 261 are incident on the right eye RE of the user U. The image light L reflected by the half mirror 281 and outside light OL transmitted through the half mirror 281 are incident on the left eye LE. The HMD 100 allows the image light L of the internally processed image and the outside light OL to be incident on the eyes of the user U in an overlapped manner. This allows the user U to see an outside view through the right light-guiding plate 26 and the left light-guiding plate 28, enabling the user to visually recognize the image of the image light L superimposed on the outside view. Each of the half mirrors 261 and 281 is an image extracting unit configured to reflect image light output by each of the right display part 22 and the left display part 24 and extract an image, and configures a display part.

3. Control System of HMD

FIG. 3 is a block diagram of the display system 1, particularly illustrating a configuration of the HMD 100 in detail.

The right display part 22 of the image display unit 20 includes a right display part substrate 210. A right I/F unit 211 coupled to the coupling cable 40, a receiving unit 213 that receives data input from the coupling device 10 via the right I/F unit 211, and an EEPROM 215 are mounted on the right display part substrate 210. The right I/F unit 211 couples the receiving unit 213, the EEPROM 215, a temperature sensor 217, the DP outer camera 61, the distance sensor 64, the DP illuminance sensor 65, and the LED indicator 67 to the coupling device 10. The receiving unit 213 couples an OLED unit 221 to the coupling device 10.

The left display part 24 includes a left display part substrate 230. A left I/F unit 231 coupled to the coupling cable 40, a receiving unit 233 that receives data input from the coupling device 10 via the left I/F unit 231 are mounted on the left display part substrate 230. A DP six-axis sensor 235 and a DP geomagnetic sensor 237 are mounted on the left display part substrate 230.

The left I/F unit 231 couples the receiving unit 233, the DP six-axis sensor 235, the DP geomagnetic sensor 237, and the temperature sensor 239 to the coupling device 10. The receiving unit 233 couples an OLED unit 241 to the coupling device 10. In addition, the left I/F unit 231 can be caused to function as the right I/F unit 211, in other words, the left I/F unit 231 may couple the receiving unit 213, the EEPROM 215, the temperature sensor 217, the DP outer camera 61, the distance sensor 64, the DP illuminance sensor 65, and the LED indicator 67 to the coupling device 10. In this case, the right I/F unit 211 couples the receiving unit 233, the DP six-axis sensor 235, the DP geomagnetic sensor 237, and the temperature sensor 239 to the coupling device 10. In addition, the left I/F unit 231 can replace the right I/F unit 211 to couple the sensors and configurations coupled to the coupling device 10 by the right I/F unit 211 to the coupling device 10.

EEPROM is an abbreviation for Electrically Erasable Programmable Read-Only Memory. In addition, the receiving unit 213 and the receiving unit 233 will be referred to as an Rx 213 and an Rx 233, respectively.

The EEPROM 215 is configured to store various types of data in a non-volatile manner. The EEPROM 215 stores, for example, data of light-emitting characteristics and display characteristics of the OLED units 221 and 241 provided in the image display unit 20, and data of characteristics of the sensors provided in the right display part 22 or the left display part 24. Specifically, the EEPROM 215 stores parameters for gamma correction of the OLED units 221 and 241, data used to compensate for detection values of the temperature sensors 217 and 239, and the like to be readable by the DP control unit 120.

The DP outer camera 61 performs imaging according to a signal input via the right I/F unit 211 and outputs the captured image to the right I/F unit 211. The DP illuminance sensor 65 is configured to receive outside light and output a detection value corresponding to the amount or intensity of received light. The LED indicator 67 is configured to light up according to a control signal or a driving current input via the right I/F unit 211.

The temperature sensor 217 is configured to detect a temperature of the OLED unit 221, and output a voltage value or a resistance value corresponding to the detected temperature as a detection value.

The distance sensor 64 is configured to output a signal indicating the detection result obtained by detecting a distance to the coupling device 10 via the right I/F unit 211.

The receiving unit 213 is configured to receive image data for display transmitted from the coupling device 10 via the right I/F unit 211 and output the image data to the OLED unit 221. The OLED unit 221 displays a video based on the image data transmitted by the coupling device 10.

The receiving unit 233 is configured to receive image data for display transmitted from the coupling device 10 via the left I/F unit 231 and output the image data to the OLED unit 241. The OLED units 221 and 241 display images based on image data transmitted by the coupling device 10.

The DP six-axis sensor 235 is a motion sensor including a three-axis acceleration sensor and a three-axis gyro sensor. The DP geomagnetic sensor 237 is a three-axis geomagnetic sensor, for example. The DP six-axis sensor 235 and the DP geomagnetic sensor 237 may be an IMU in which the above-described sensors are modularized, or may be a module in which the DP six-axis sensor 235 and the DP geomagnetic sensor 237 are integrated. IMU is an abbreviation for Inertial Measurement Unit. The temperature sensor 239 is configured to detect a temperature of the OLED unit 241. Each of the DP six-axis sensor 235, the DP geomagnetic sensor 237, and the temperature sensor 239 outputs a detection value to the coupling device 10.

Each unit of the image display unit 20 operates with power supplied from the coupling device 10 through the coupling cable 40. The image display unit 20 includes a power supply unit 229 in the right display part 22, and a power supply unit 249 in the left display part 24. The power supply unit 229 is configured to distribute and supply power supplied by the coupling device 10 through the coupling cable 40 to each unit of the right display part 22 including the right display part substrate 210. The power supply unit 249 is configured to distribute and supply power supplied by the coupling device 10 via the coupling cable 40 to each unit of the left display part 24 including the left display part substrate 230. The power supply units 229 and 249 may include a conversion circuit or the like configured to convert a voltage. The power supply units 229 and 249 correspond to a power supply unit together with a power supply control unit 126.

The coupling device 10 includes an I/F unit 110, a DP control unit 120, a sensor control unit 122, a display control unit 124, a power supply control unit 126, a non-volatile storage unit 130, an operation unit 140, a connection unit 145, and an audio processor 147.

The I/F unit 110 includes a connector 11D and an interface circuit configured to execute communication protocols conforming to various communication standards. The I/F unit 110 may be, for example, an interface substrate on which the connector 11D and the interface circuit are mounted. The I/F unit 110, for example, may include an interface for a memory card that can be coupled to an external storage device or storage medium, or the like, or the I/F unit 110 may be configured as a radio communication interface.

The DP control unit 120 corresponds to a control unit. The DP control unit 120 includes a processor such as a CPU or a microcomputer, and this processor is configured to execute a program to control each unit of the coupling device 10. The DP control unit 120 may include a RAM providing work areas for the processor. RAM is an abbreviation for Random Access Memory. CPU is an abbreviation for Central Processing Unit.

The non-volatile storage unit 130, the operation unit 140, the connection unit 145, and the audio processor 147 are coupled to the DP control unit 120. The non-volatile storage unit 130 is a ROM configured to store programs to be executed by the DP control unit 120 and data in a non-volatile manner. ROM is an abbreviation for Read Only Memory. The non-volatile storage unit 130 stores a device driver.

The DP control unit 120 executes an anomaly detection process of detecting an anomaly of a device included in the HMD 100 at each preset time. Devices that are subject of the anomaly detection process include, for example, sensors such as the DP illuminance sensor 65, the temperature sensors 217 and 239, the distance sensor 64, the DP six-axis sensor 235, and the DP geomagnetic sensor 239, the DP outer camera 61, the audio processor 147, and the like.

The DP control unit 120 determines whether it is possible to access the driver that drives a device and whether a value indicating an anomaly has been written in a register in which a value indicating the state of the driver is written, and thereby performs the anomaly detection process.

In addition, when the device that is subject to the anomaly detection process is a sensor, the DP control unit 120 determines whether the sensor value input from the sensor indicates an abnormal value and detects an anomaly of the device.

When an anomaly is detected, the DP control unit 120 restarts the driver of the device of which the anomaly has been detected. For example, when an anomaly of a display driver that drives the OLED units 221 and 241 is detected, the DP control unit 120 restarts the display driver.

In addition, when an anomaly of a sensor such as the DP illuminance sensor 65, the distance sensor 64, the DP six-axis sensor 235, or the DP geomagnetic sensor 239 is detected, the DP control unit 120 first restarts the device driver that drives the sensor of which the anomaly has been detected. Then, the DP control unit 120 restarts the display driver.

The time required for restarting the display driver is, for example, 2 seconds. When the display driver is restarted after the device driver is restarted, the time required for the restart is, for example, 4 seconds. The time of four seconds corresponds to the first time, and the time of two seconds corresponds to the second time.

The sensor control unit 122 causes the sensor group included in the image display unit 20 to operate. The sensor group includes the DP outer camera 61, the distance sensor 64, the DP illuminance sensor 65, the temperature sensor 217, the DP six-axis sensor 235, the DP geomagnetic sensor 237, and the temperature sensor 239. The sensor control unit 122 is configured to perform setting and initialization of a sampling cycle of each sensor according to control of the DP control unit 120, and execute energization to each sensor, transmission of control data, acquisition of detection values and the like, according to the sampling cycle of each sensor.

The sensor control unit 122 outputs sensor data indicating a detection value or a detection result of each sensor to the I/F unit 110 at a preset timing. The sensor control unit 122 may include an A/D converter that converts analog signals into digital data. In this case, the sensor control unit 122 converts an analog signal of a detection value or a detection result acquired from a sensor of the image display unit 20 into sensor data and outputs the sensor data. The sensor control unit 122 may acquire digital data of a detection value or a detection result from the sensor of the image display unit 20, perform conversion of a data format, adjustment of an output timing, or the like, and output the sensor data to the I/F unit 110.

The operations of the sensor control unit 122 enable the control device 300 coupled to the I/F unit 110 to acquire detection values of each sensor of the HMD 100, and captured images of the DP outer camera 61.

The sensor control unit 122 may be configured to output, as sensor data, results obtained by performing arithmetic processing based on the detection values of each sensor described above. For example, the sensor control unit 122 may be configured to comprehensively process detection values and detection results of a plurality of sensors and to function as a so-called sensor fusion processing unit. In this case, the sensor control unit 122 may generate sensor data of a virtual sensor that is not included in the sensors of the image display unit 20 using sensor fusion. For example, the sensor control unit 122 may output, as sensor data, locus data indicating a locus along which the image display unit 20 has moved, coordinate data indicating a position of the image display unit 20 in a three-dimensional space, and direction data indicating a direction of the image display unit 20. Here, the coordinate data may be data indicating relative coordinates with reference to a position of the coupling device 10, or may be data indicating a position with respect to a reference position set in the space in which the image display unit 20 is present. The direction data may be data indicating a direction with reference to a position or a direction of the coupling device 10, or may be data indicating a direction with respect to a reference position set in the space in which the image display unit 20 is present.

The sensor control unit 122 executes a communication protocol with a device coupled to the connector 11D by a USB cable 46 and outputs sensor data.

The display control unit 124 is configured to execute various kinds of processing to cause the image display unit 20 to display an image based on image data or display data included in a playback signal input to the I/F unit 110. In this embodiment, image data is transmitted in an alternative mode of USB-TypeC through the connector 11D configured by a USB-TypeC connector. The display control unit 124 is configured to execute various kinds of processing, for example, cutting out of a frame, resolution conversion, scaling, intermediate frame generation, frame rate conversion, and the like. The display control unit 124 is configured to output image data corresponding to the OLED units 221 and 241 to the connection unit 145. The image data input to the connection unit 145 is transmitted as image data 201 from the connector 11A to the right I/F unit 211 and the left I/F unit 231. The display control unit 124 adjusts or changes the display state of the image display unit 20 in accordance with the display control data input to the I/F unit 110.

At least one of the sensor control unit 122 and the display control unit 124 may be realized in cooperation of software and hardware by a processor executing a program. That is, the sensor control unit 122 and the display control unit 124 are configured by a processor to execute a program and execute the operations described above. In this example, the sensor control unit 122 and the display control unit 124 may be realized by a processor constituting the DP control unit 120 executing the program. In other words, the processor may execute the program and thereby function as the DP control unit 120, the display control unit 124, and the sensor control unit 122. Here, the processor can be paraphrased as a computer. The sensor control unit 122 and the display control unit 124 may include a work memory for data processing, and may execute processing by using a memory of the DP control unit 120.

The display control unit 124 and the sensor control unit 122 may be configured by programmed hardware such as a DSP or an FPGA. The sensor control unit 122 and the display control unit 124 may be integrated to be configured as an SoC-FPGA. DSP is an abbreviation for Digital Signal Processor. FPGA is an abbreviation for Field Programmable Gate Array. SoC is an abbreviation for System-on-a-Chip.

The power supply control unit 126 is a circuit that is coupled to the connector 11D and supplies power to each unit of the coupling device 10 and the image display unit 20 based on power supplied from the connector 11D.

The power supply control unit 126 corresponds to a power supply unit together with the power supply units 229 and 249.

The operation unit 140 detects an operation of a switch and the like included in the coupling device 10 and outputs data indicating the operation content to the DP control unit 120.

The audio processor 147 generates audio signals according to audio data input from the DP control unit 120. The audio data includes audio data included in a playback signal input from the control device 300. In addition, the audio processor 147 includes an amplifier, amplifies a generated audio signal, and outputs the amplified audio signal to the connection unit 145. This audio signal is output from the connection unit 145 to the right earphone 32 and the left earphone 34 through the audio connector 36. The audio processor 147 generates audio data of the sound collected by the microphone 62, and output the audio data to the DP control unit 120. The audio data output by the audio processor 147 may be processed by the sensor control unit 122 in the same manner as sensor data of the sensors included in the image display unit 20.

4. Configuration of Control Device

Figure 4:
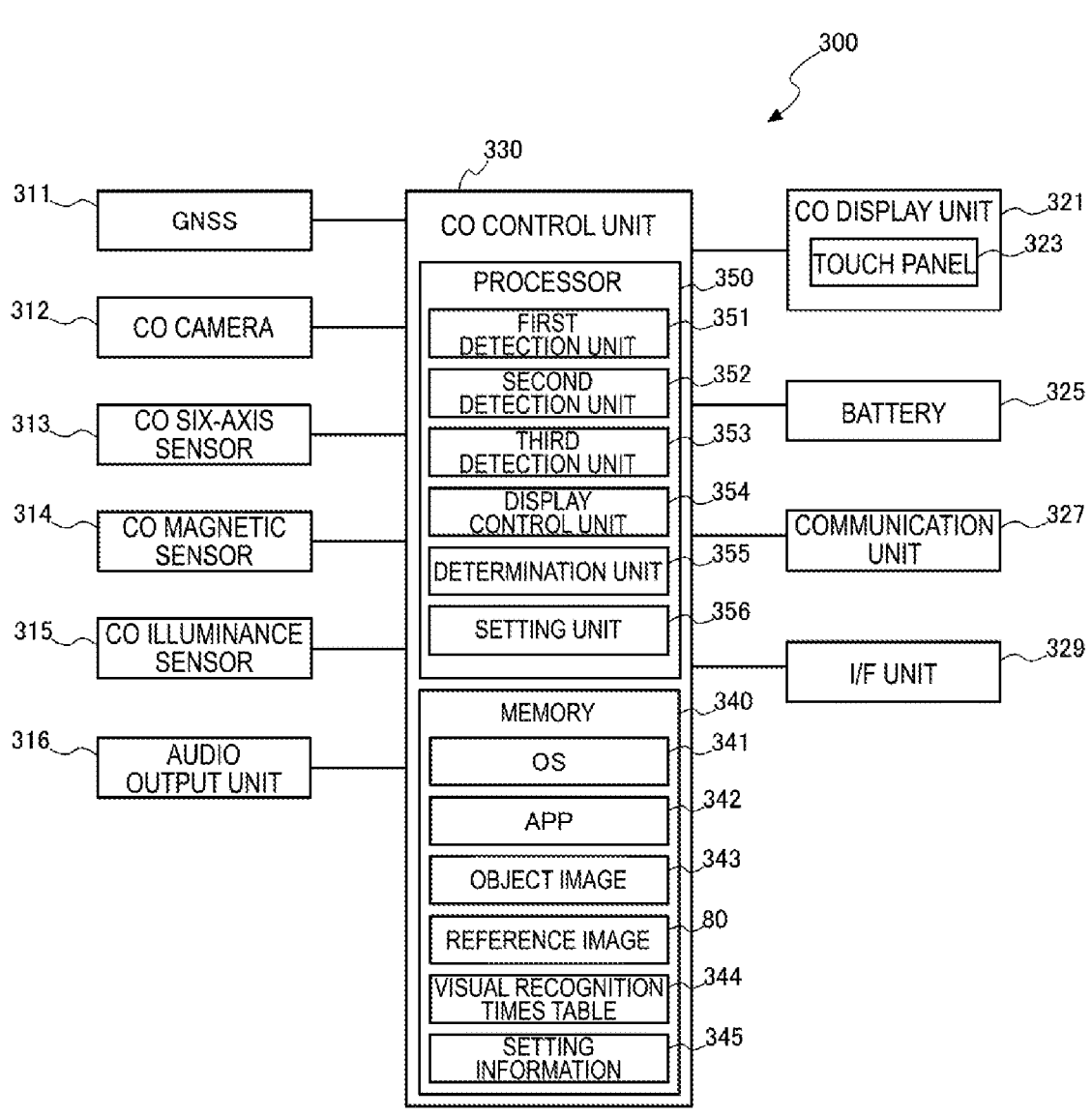
FIG. 4 is a block diagram illustrating a configuration of a control device.

FIG. 4 is a block diagram of the control device 300.

The control device 300 includes a GNSS 311, a CO camera 312, a CO six-axis sensor 313, a CO magnetic sensor 314, a CO illuminance sensor 315, an audio output unit 316, a CO display unit 321, a battery 325, a communication unit 327, an I/F unit 329, and a CO control unit 330.

The GNSS 311, the CO camera 312, the CO six-axis sensor 313, the CO magnetic sensor 314, the CO illuminance sensor 315, the audio output unit 316, the CO display unit 321, the battery 325, the communication unit 327, and the I/F unit 329 are coupled to the CO control unit 330.

The GNSS 311 measures a position using a satellite positioning system, and outputs the position of the control device 300 to the CO control unit 330. GNSS is an abbreviation for Global Navigation Satellite System.

The CO camera 312 is a digital camera provided in the main body of the control device 300, is disposed adjacent to a touch panel 323, and performs imaging in the direction opposed to the touch panel 323, for example. The CO camera 312 performs imaging following control of the CO control unit 330 and outputs captured images to the CO control unit 330.

The CO six-axis sensor 313 is a motion sensor including a three-axis acceleration sensor and a three-axis gyro sensor and outputs sensor data indicating a detection value to the CO control unit 330. The CO magnetic sensor 314 is, for example, a three-axis geomagnetic sensor and outputs sensor data indicating a detection value to the CO control unit 330. The CO six-axis sensor 313 and the CO magnetic sensor 314 may be an IMU in which the above-described sensors are modularized, or may be a module in which the CO six-axis sensor 313 and the CO magnetic sensor 314 are integrated.

The CO illuminance sensor 315 receives outside light and outputs sensor data indicating a detection value corresponding to the amount or intensity of received light to the CO control unit 330.

The audio output unit 316 includes a speaker and outputs sound from the speaker following control of the CO control unit 330. The audio output unit 316 may include an amplifier that amplifies an audio signal output by the CO control unit 330 and outputs the amplified audio signal to the speaker. When the CO control unit 330 is configured to output digital audio data, the audio output unit 316 may include a D/A converter that converts digital audio data into an analog audio signal.

The CO display unit 321 includes the touch panel 323 and displays characters and images on the touch panel 323 following control of the CO control unit 330.

The battery 325 is a secondary battery built in the main body of the control device 300, and supplies power to each unit of the control device 300 and also supplies power to the coupled HMD 100.

When the HMD 100 is coupled to the I/F unit 329, the CO control unit 330 performs negotiation with the HMD 100 to determine power to be supplied to the HMD 100. The negotiation is, for example, processing for setting a power role, setting an amount of power to be exchanged, and the like. A power role is a power source that functions as a supply source that supplies power or a power sink that receives power from a power source.

The CO control unit 330 supplies power determined in the negotiation to the HMD 100 via the I/F unit 329.

The battery 325 and the CO control unit 330 correspond to a first supply unit.

The communication unit 327 supports a wireless communication protocol such as Bluetooth or Wi-Fi, and performs wireless communication with an external device of the display system 1. Bluetooth and Wi-Fi are registered trademarks. The communication unit 327 may be configured to execute mobile data communication by using a mobile communication network such as LTE or a fifth-generation mobile communication system. LTE is a registered trademark.

The I/F unit 329 includes a connector, which is not illustrated, to which a data communication cable is coupled, and an interface circuit that executes communication protocols that are in compliance with various communication standards through the connector. The I/F unit 329 includes, for example, a USB-standard-compliant connector and an interface circuit, transmits and receives data through the USB cable 46, and supplies power to the HMD 100.

The CO control unit 330 is a computer device including a memory 340 and a processor 350. The memory 340 includes a RAM and a ROM. ROM is an abbreviation for Read Only Memory. The RAM forms a work area of the processor 350. The ROM stores programs to be executed by the processor 350 and various types of data to be processed by the processor 350 in a non-volatile manner.

The ROM stores an OS 341 that is a basic control program executed by the processor 350, an APP 342, an object image 343, a reference image 80, a visual recognition times table 344, and setting information 345 in a non-volatile manner. OS is an abbreviation for Operating System. APP is an abbreviation for Application Program. The APP 342 includes an APP for the control device 300 to control an image to be displayed by the image display unit 20.

The object image 343 is a preset image of an object 70 and is used when the object 70 is to be specified from an image captured by the DP outer camera 61.

The reference image 80 is an image to be displayed in a display region 55 by the image display unit 20 and is an image to be visually recognized by the user U wearing the image display unit 20 on his or her head. The display region 55 is a region in which the image display unit 20 can display an image.

The visual recognition times table 344 is a table for counting the number of visual recognition times that the user U visually recognizes the reference image 80 displayed by the image display unit 20. The visual recognition times table 344 corresponds to a counting table.

The setting information 345 includes information of operation settings of the control device 300. The operation settings include settings related to the display position of the reference image 80 to be displayed on the image display unit 20, and the like.

The processor 350 is an arithmetic processing device including a processor such as a CPU or an MPU. The processor 350 may be configured by a single processor or by a plurality of processors. In addition, the processor 350 may be configured by an SoC integrated with a part or all of the memory 340 or other circuitry. In addition, the processor 350 may be configured by a combination of a CPU that executes a program and a DSP that executes predetermined arithmetic processing. Furthermore, all of the functions of the processor 350 may be implemented in hardware, or may be configured using a programmable device. MPU is an abbreviation for Micro-Processing Unit. DSP is an abbreviation for Digital Signal Processor.

The CO control unit 330 includes a first detection unit 351, a second detection unit 352, a third detection unit 353, a display control unit 354, a determination unit 355, and a setting unit 356 as functional configurations.

These functional configurations are functions realized by the processor 350 executing a control program for the OS 341, the APP 342, or the like to perform arithmetic operations.

The first detection unit 351 detects a direction of the line of sight of the user U.

The first detection unit 351 acquires an image captured by a DP inner camera 63 from the memory 340.

The first detection unit 351 detects a direction of the line of sight of the user U by analyzing the acquired image captured by the DP inner camera 63. To be specific, the first detection unit 351 detects an image of light reflected on the surface of the eyeballs of the right eye RE and the left eye LE or an image of the pupils from the image captured by the DP inner camera 63, and identifies the direction of the line of sight of the user U. In addition, the first detection unit 351 may obtain a change in the direction of the line of sight of the user U by detecting the eyeball movement of each of the right eye RE and the left eye LE. The first detection unit 351 outputs information indicating the detected direction of the line of sight to the determination unit 355. Furthermore, the first detection unit 351 may set the center of the line of sight based on the positions of the pupils of the right eye RE and the left eye LE detected from the image captured by the DP inner camera 63.

The second detection unit 352 detects the orientation of the head of the user U.

The second detection unit 352 acquires sensor data indicating the sensing results of the DP six-axis sensor 235 and the DP geomagnetic sensor 237 from the memory 340.

The second detection unit 352 detects the azimuth angle formed in the direction in which the head of the user U faces based on the acquired sensor data of the DP geomagnetic sensor 237. In addition, the second detection unit 352 detects a roll angle that is a rotation angle of the head around the Y axis and a pitch angle that is a rotation angle of the head around the X axis based on sensor data of the gyro sensor included in the DP six-axis sensor 235. The second detection unit 352 outputs information on the detected azimuth angle, pitch angle, and roll angle to the determination unit 355.

The third detection unit 353 detects the object 70.

The third detection unit 353 acquires an image captured by the DP outer camera 61 from the memory 340. In addition, the third detection unit 353 acquires the object image 343 from the memory 340.

The third detection unit 353 determines whether the object image 343 is included in the captured image by using pattern matching between feature points included in the object image 343 and those included in the captured image. When the object 70 is detected from the captured image, the third detection unit 353 outputs a detection notification that the object 70 has been detected to the display control unit 354.

The display control unit 354 receives the input of the detection notification from the third detection unit 353. When the detection notification is input, the display control unit 354 acquires sensor data of the distance sensor 64 from the memory 340. The display control unit 354 calculates the distance from the HMD 100 to the object 70 based on the acquired sensor data. The distance sensor 64 corresponds to a fourth detection unit. For example, the display control unit 354 may use the distance from the distance sensor 64 to the object 70 detected by the distance sensor 64 as it is as the distance from the HMD 100 to the object 70. In addition, the display control unit 354 may calculate the distance from the HMD 100 to the object 70 by adding a predetermined value to or subtracting the predetermined value from the distance from the distance sensor 64 to the object 70 detected by the distance sensor 64.

Next, the display control unit 354 acquires the reference image 80 associated with the object 70 detected by the third detection unit 353 from the memory 340 and causes the image display unit 20 to display the acquired reference image 80 in the display region 55.

The reference image 80 is an image referred to by the user U when the user U works on the object 70. The reference image 80 includes, for example, an image in which the procedure of the work, cautionary points, and the like are described. In addition, the reference image 80 includes, for example, an image of a document file in which the user U can enter a work record by operating an operation device such as the touch panel 323, or the like.

Figure 5:
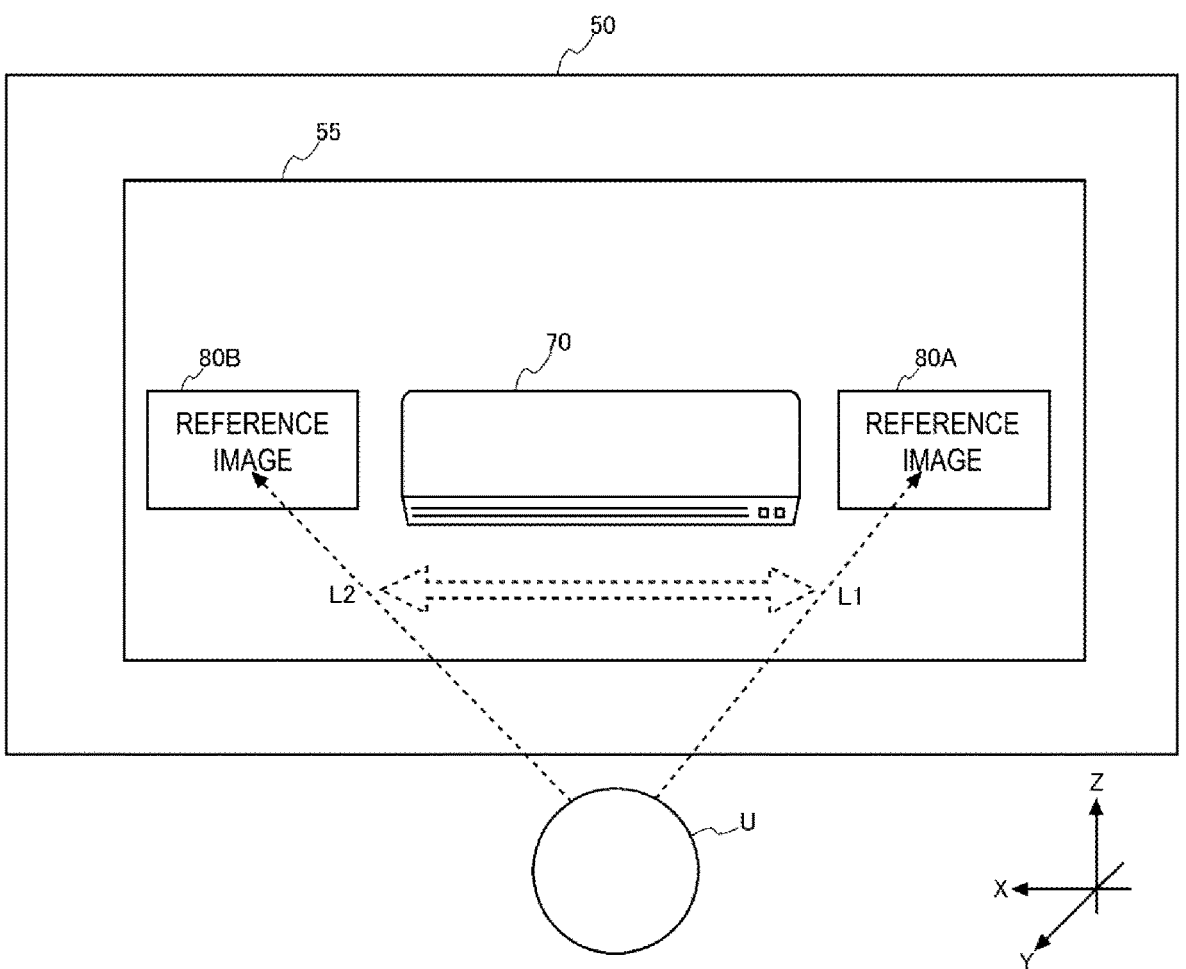
FIG. 5 is a diagram illustrating reference images before its display position is changed.

FIG. 5 is a diagram illustrating a visual field range visually recognized by the user U.

The visual field range 50 includes the display region in which the image display unit 20 can display the reference image 80. The display region 55 is superimposed on an outside view, which enables the user U to simultaneously visually recognize the reference image 80 displayed by the image display unit 20 and the outside view. In addition, the display region is a region in a three-dimensional space. In FIG. 5, the X-axis direction corresponds to the horizontal direction of the display region 55, the Y-axis direction corresponds to the front-rear direction of the display region 55, and the Z-axis direction corresponds to the vertical direction of the display region 55. A virtual display position of the reference image 80 in the front-rear direction, that is, in the Y-axis direction, can be changed by adjusting the convergence angle between the reference image 80 displayed on the right light-guiding plate 26 and the reference image 80 displayed on the left light-guiding plate 28.

The user U wears the image display unit 20 on his/her head and approaches the object 70 on which work will be performed. When the preset object 70 is detected, the display control unit 354 reads the reference image 80 associated with the object 70 or the reference image 80 selected by the user U operating the touch panel 323 from the memory 340. The display control unit 354 causes the image display unit 20 to display the read reference image 80 in the display region 55. The user U can visually recognize the object 70 and the reference image 80 displayed by the image display unit 20 at the same time.

The display control unit 354 adjusts the distance in the Y-axis direction at which the reference image 80 is displayed based on the distance from the HMD 100 to the object 70 calculated by using sensor data of the distance sensor 64. That is, the display control unit 354 adjusts the display position of the reference image 80 in the Y-axis direction so that the distance from the HMD 100 to the object 70 and the distance from the HMD 100 to the reference image 80 are equal or substantially equal in the Y-axis direction.

In addition, although the reference image 80 may be displayed at any position in the X-axis and Z-axis directions in the display region 55, the reference image 80 is preferably displayed around the object 70. For example, a display position may be set around the object 70 in any of four directions of the upper side, the lower side, the left side, and the right side of the object, and priority may be given to the respective display positions. The setting of the priority is information included in the setting information 345. When the reference image 80 is selected, the display control unit 354 determines a display position at which the reference image 80 is to be displayed in accordance with the setting of the priority. For example, the display control unit 354 causes the reference image 80 selected first to be displayed at the display position with the first priority, and causes the reference image 80 selected next to be displayed at the display position with the second priority.

Next, the determination unit 355 determines the reference image 80 visually recognized by the user U.

The determination unit 355 receives input of the information indicating the direction of the line of sight of the user U detected by the first detection unit 351 and the information indicating the orientation of the head of the user U detected by the second detection unit 352.

The determination unit 355 determines the reference image 80 to be referred to by the user U based on at least one of the input direction of the line of sight of the user U and the input orientation of the head of the user U.

When the line of sight of the user U is directed to the reference image 80 for a preset time or longer, for example, the determination unit 355 determines that the user U has visually recognized the reference image 80.

The determination unit 355 outputs identification information for identifying the reference image 80 determined to have been visually recognized by the user U to the setting unit 356.

The setting unit 356 receives the input of the identification information of the reference image 80 determined to have been visually recognized by the user U. The setting unit 356 generates the visual recognition times table 344 based on the input identification information.

The visual recognition times table 344 is a table in which the identification information of the reference image 80 and the number of visual recognition times of the user U are registered in association with each other. The reference image 80 whose identification information has been registered in the visual recognition times table 344 is the reference image 80 being displayed in the display region 55 under control of the display control unit 354. Upon receiving the input of the identification information of the reference image 80 from the determination unit 355, the setting unit 356 adds 1 to the number of visual recognition times of the reference image 80 that matches the input identification information.

The registered information in the visual recognition times table 344 is reset every preset unit time. The unit time can be changed through an operation of the user U.

Next, the setting unit 356 sets a first image and a second image with reference to the visual recognition times table 344.

The first image and the second image are reference images 80 of which the number of visual recognition times of the user U within a unit time is equal to or greater than a preset number of times. In addition, the first image is the reference image 80 having the highest number of visual recognition times within the unit time. The second image is an image except for the reference image 80 set as the first image among the reference images 80 having the number of visual recognition times equal to or higher than the preset number of times. One image is set as the reference image 80 as the first image, and one or more images are set as the reference image 80 as the second image.

FIG. 5 is a diagram illustrating reference images 80 before its display position is changed. FIG. 5 illustrates an air conditioner as an example of the object 70. In addition, a reference image 80A is displayed as an example of the reference image 80 on the right side of the object 70 when viewed from the user U, and a reference image 80B is displayed as an example of the reference image 80 on the left side of the object 70 when viewed from the user U. In addition, it is assumed that the reference image 80A is set as a first image and the reference image 80B is set as a second image based on the number of visual recognition times of the user U. In addition, FIG. 5 illustrates a line-of-sight direction L1 of the user U when the user U visually recognizes the reference image 80A and a line-of-sight direction L2 of the user U when the user U visually recognizes the reference image 80B.

The determination unit 355 determines whether the user U has visually recognized the reference image 80A that is the first image based on the detected orientation of the head of the user U or the detected direction of the line of his or her sight.

If it is determined that the user U has visually recognized the reference image 80A, the determination unit 355 determines whether to change the display position of the reference image 80B that is the second image.

The determination unit 355 determines whether the display position of the reference image 80A that is the first image and the display position of the reference image 80B that is the second image are at positions satisfying a preset change condition.

When the preset change condition is satisfied, the determination unit 355 changes the display position of the reference image 80B that is the second image based on the display position of the reference image 80A that is the first image.

The change condition includes the following condition.

The change condition includes, for example, a case in which the reference image 80A and the reference image 80B are displayed on both left and right sides or both sides above and below the object 70, sandwiching the object 70 therebetween. When the reference image 80A and the reference image 80B are displayed on both left and right sides or both sides above and below the object 70, sandwiching the object 70 therebetween, the movement distance of the line of sight of the user U increases. For this reason, when the reference image 80A and the reference image 80B are displayed on both the left and right sides or both sides above and below the object 70, sandwiching the object 70 therebetween, the determination unit 355 changes the display position of the reference image 80B that is the second image.

In addition, the change condition includes a case where a display distance that is a distance between the reference image 80A and the reference image 80B being displayed in the display region 55 is longer than a preset distance. The display distance is a distance in the X-axis direction or the Z-axis direction in the display region 55. In addition, the display distance between the reference image 80A and the reference image may be, for example, the distance between the center of the reference image 80A and the center of the reference image 80B, or the distance between the reference image 80A and the reference image 80B in a preset direction such as the X-axis direction.

Figure 6:
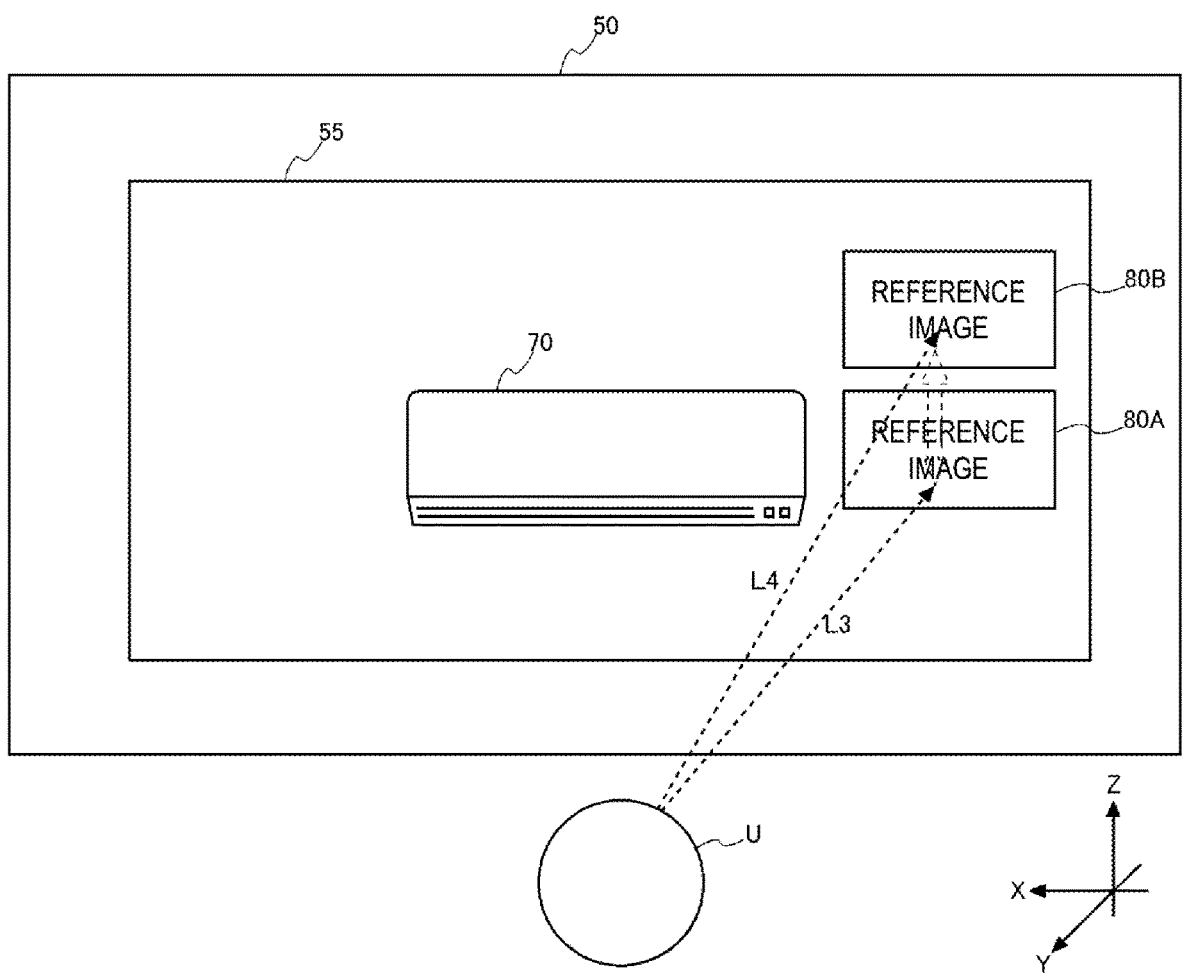
FIG. 6 is a diagram illustrating reference images after their display positions are changed.

FIG. 6 is a diagram illustrating the visual field range of the user U and a diagram illustrating the reference image after its display position is changed.

Next, the changed display position of the reference image 80B that is the second image will be described.

The display control unit 354 changes the display position of the reference image 80B so that the display distance between the reference image 80B after the change and the reference image 80A becomes shorter than that before the display position of the reference image 80B is changed. More specifically, when the user U visually recognizes the reference image 80A and the reference image 80B alternately, the display position of the reference image 80B is changed so that the line of sight of the user U is moved in a shorter distance. In addition, FIG. 6 illustrates a line-of-sight direction L3 of the user U when the user U visually recognizes the reference image and a line-of-sight direction L4 of the user U when the user U visually recognizes the reference image 80B. As is apparent from a comparison of FIGS. 5 and 6, the movement distance of the line of sight of the user after the display position of the reference image 80B is changed is shorter than the movement distance of the line of sight of the user before the display position of the reference image 80B is changed.

When the reference image 80A and the reference image are displayed on both the left and right sides or both sides above and below the object 70, sandwiching the object 70 therebetween, the display control unit 354 causes the reference image 80B to be displayed on the same side as the reference image 80A. That is, when the reference image 80A is displayed on the right side of the object 70 and the reference image 80B is displayed on the left side of the object 70 when viewed from the user U, the reference image 80B that is the second image is displayed on the right side of the object 70 as illustrated in FIG. 5.

In addition, when the reference image 80A is displayed on the lower side of the object 70 and the reference image 80B is displayed on the upper side of the object 70 when viewed from the user U, the reference image 80B that is the second image is displayed on the lower side of the object 70 as in the reference image 80A.

Figure 7:
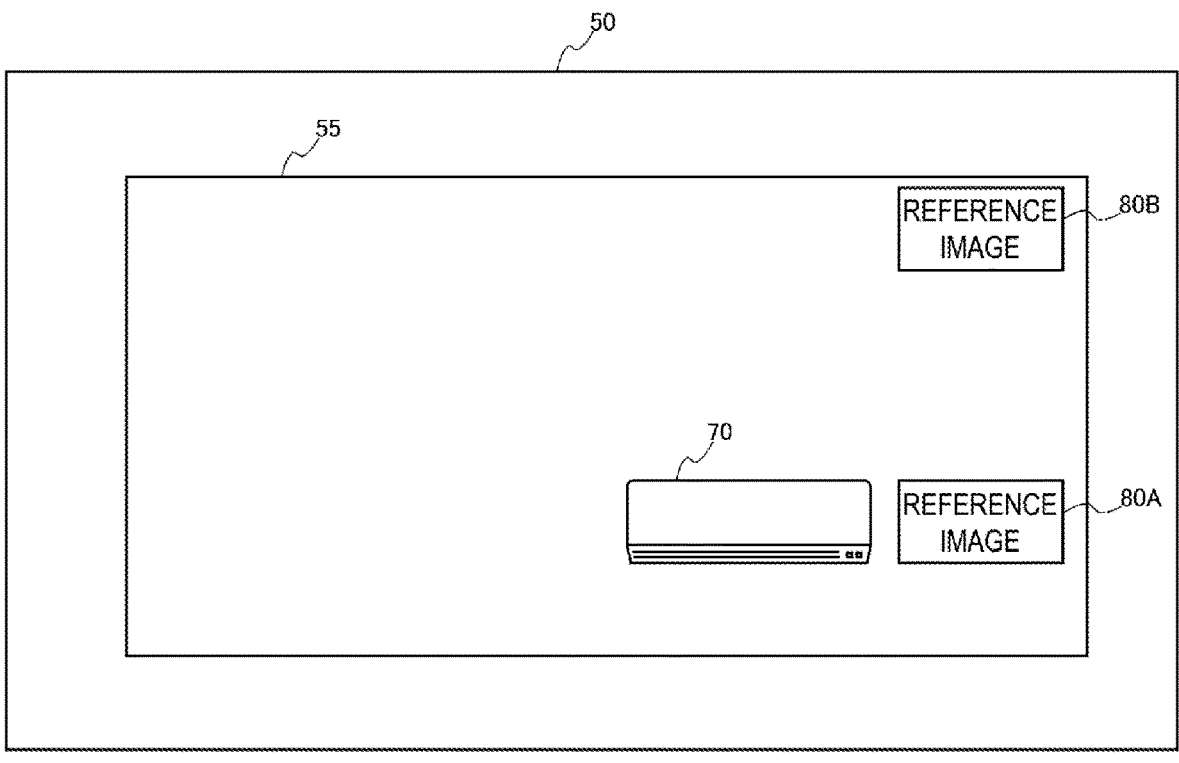
FIG. 7 is a diagram illustrating reference images before their display positions are changed.
Figure 8:
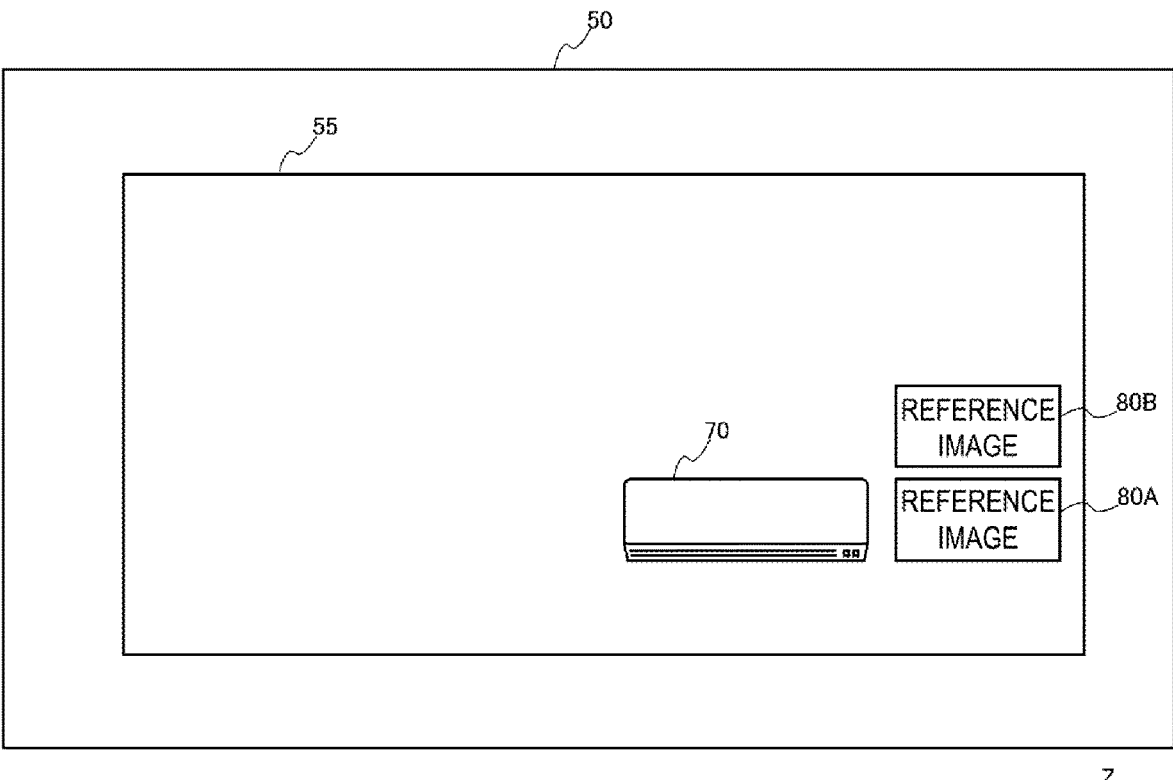
FIG. 8 is a diagram illustrating reference images after their display positions are changed.

FIGS. 7 and 8 are diagrams illustrating the visual field range 50 of the user U. In particular, FIG. 7 is a diagram illustrating the reference image 80B before its display position is changed, and FIG. 8 is a diagram illustrating the reference image 80B after its display position is changed.

FIG. 7 illustrates a case in which the reference image 80A and the reference image 80B are displayed on the same side, i.e., the right side of the object 70 when viewed from the user U. Even in such a case, when the distance between the reference image 80A and the reference image 80B is longer than the preset distance, the display control unit 354 moves the display position of the reference image 80B with reference to the display position of the reference image 80A. FIG. 8 illustrates an example in which the reference image 80B is displayed immediately above the reference image 80A.

Figure 9:
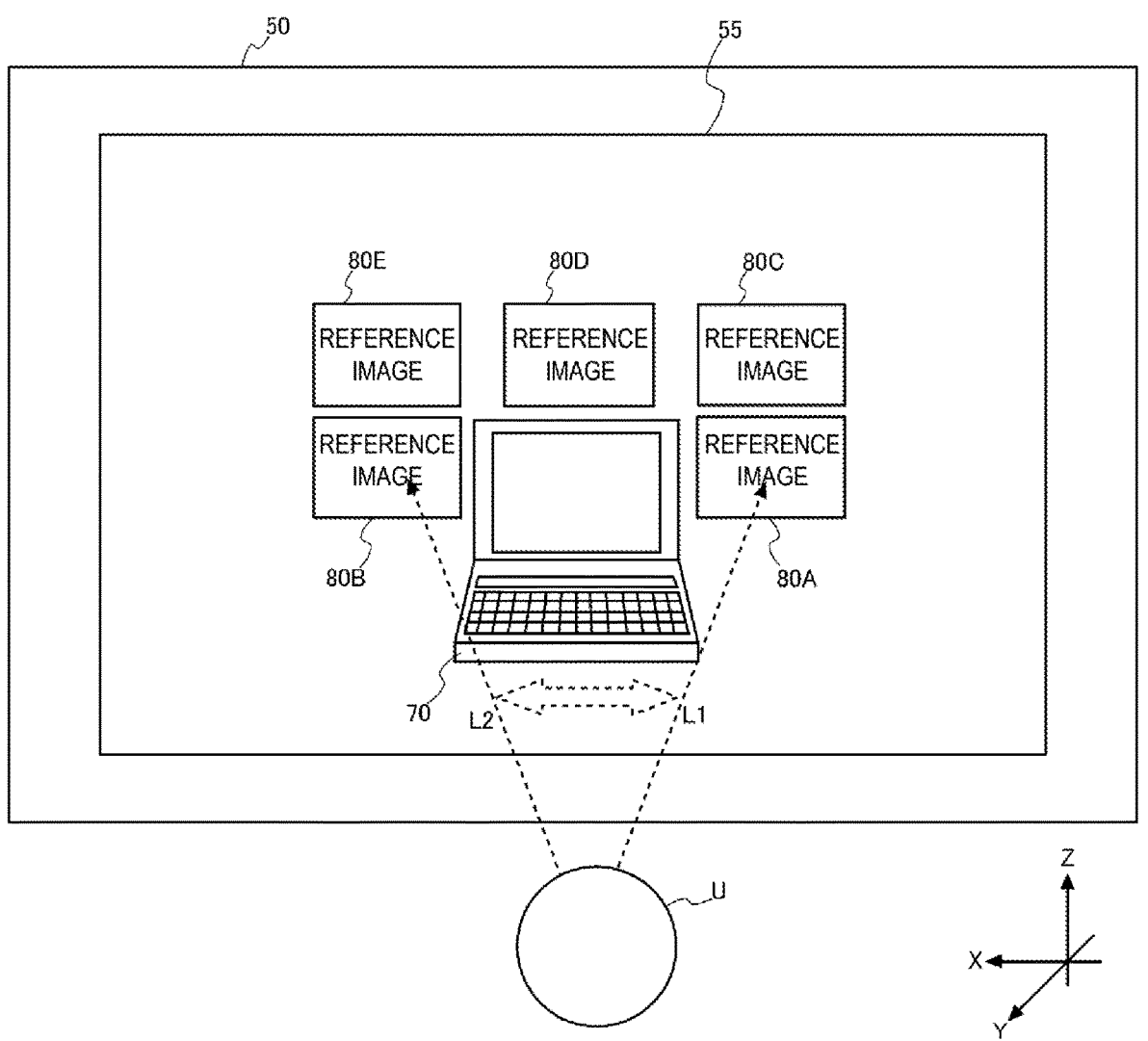
FIG. 9 is a diagram illustrating reference images before their display positions are changed.
Figure 10:
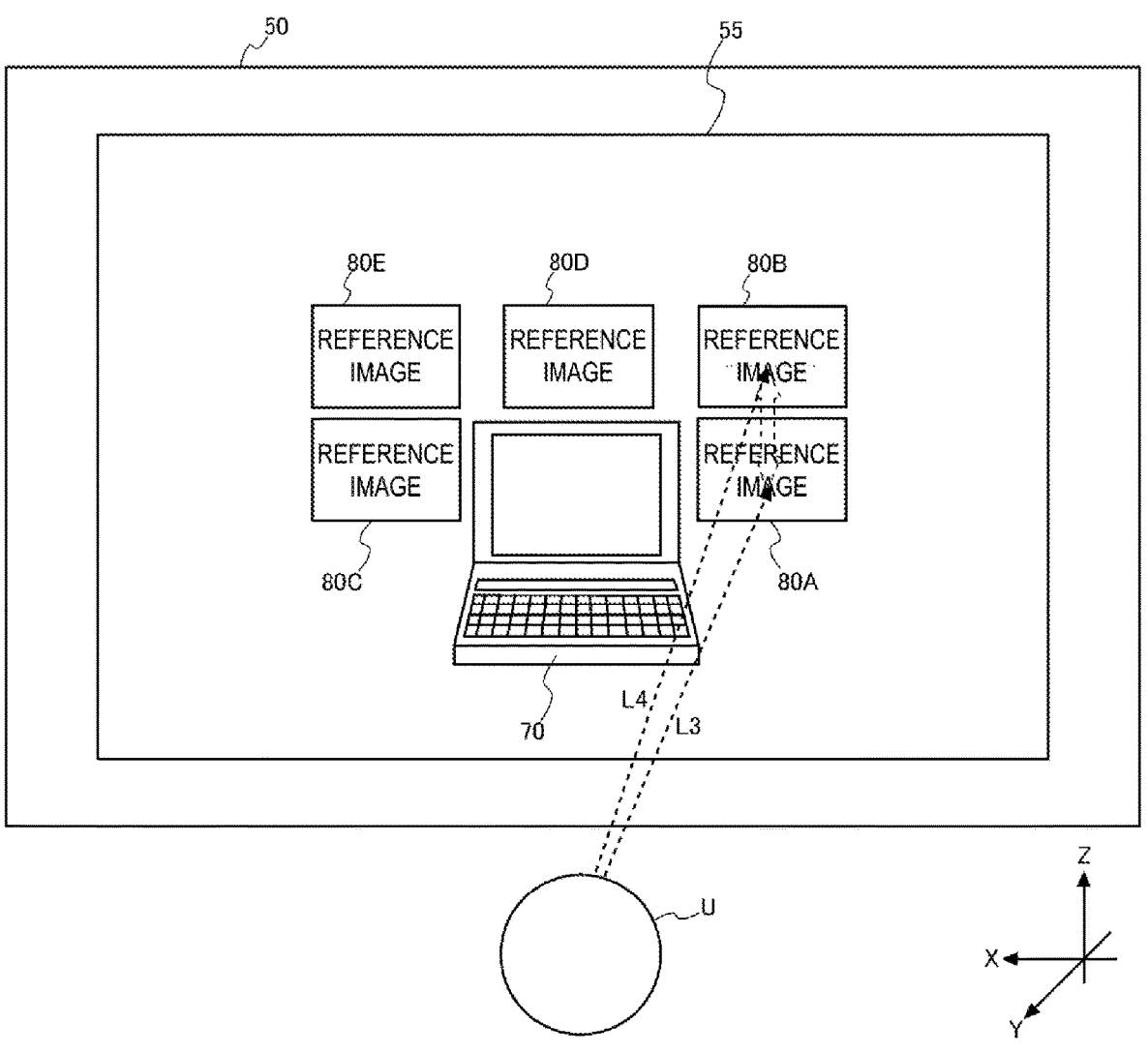
FIG. 10 is a diagram illustrating the reference images after their display positions are changed.
Figure 11:
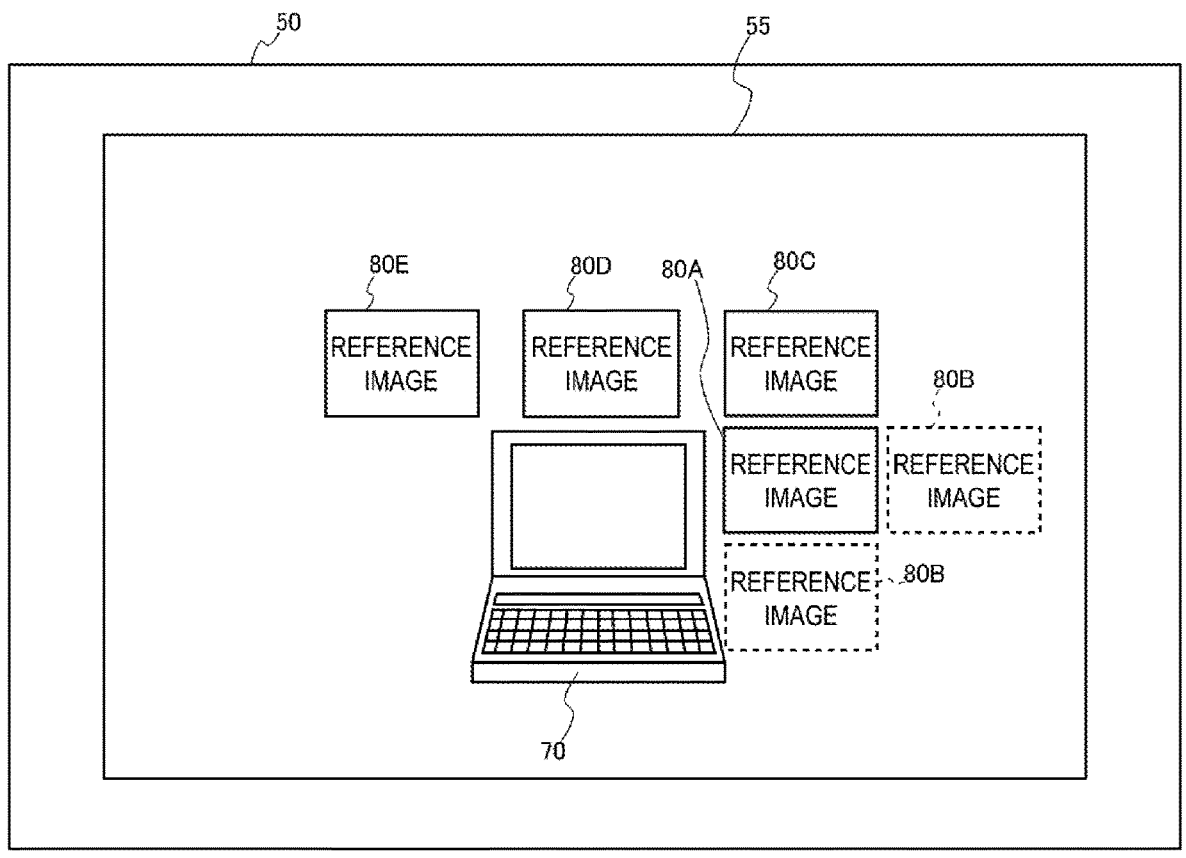
FIG. 11 is a diagram illustrating the reference images after their display positions are changed.

FIGS. 9 to 11 are diagrams illustrating the visual field range 50 of the user U. In particular, FIGS. 9 to 11 are diagrams illustrating a state in which five reference images 80A to 80E are displayed as examples of the reference image 80 in the display region 55. In addition, FIG. 9 is a diagram illustrating the reference images 80A to 80E before their display positions are changed. In addition, FIGS. 10 and 11 are diagrams illustrating the reference images 80A to 80E after their display positions are changed.

It is assumed that the five reference images 80A to 80E are displayed in the display region 55 as illustrated in FIG. 9. The determination unit 355 determines the reference image 80 visually recognized by the user U based on the orientation of the head of the user U or the direction of the line of his or her sight, and the setting unit 356 generates a visual recognition times table and calculates the number of visual recognition times of the user U within a unit time for each of the reference images 80. The setting unit 356 sets each of a first image and a second image based on the calculated number of visual recognition times. In the display state of FIG. 9, it is assumed that the reference image 80A is set as a first image and the reference image 80B is set as a second image. In addition, FIG. 9 illustrates a line-of-sight direction L1 of the user U when the user U visually recognizes the reference image 80A and a line-of-sight direction L2 of the user U when the user U visually recognizes the reference image 80B.

FIG. 10 is a diagram illustrating the display position of the reference image 80B set as the second image after its display position is changed. The display control unit 354 changes the display position of the reference image 80B set as the second image. The display control unit 354 causes the reference image 80B that was displayed on the side opposite to the reference image 80A sandwiching the object 70 therebetween to be displayed on the same side as the reference image 80A. The display control unit 354 causes the reference image 80B that is the second image to be displayed at the display position of the reference image 80C which is set as neither a first image nor a second image. At this time, the display control unit 354 causes the reference image 80C that is not set as the second image to be displayed at the display position at which the reference image 80B is displayed. FIG. 10 illustrates a line-of-sight direction L3 of the user U when the user U visually recognizes the reference image 80A and a line-of-sight direction L4 of the user U when the user U visually recognizes the reference image 80B. As is apparent from a comparison of FIGS. 9 and 10, the movement distance of the line of sight of the user after the display position of the reference image 80B is changed is shorter than the movement distance of the line of sight of the user before the display position of the reference image 80B is changed.

FIG. 11 is a diagram illustrating the display position of the reference image 80B set as the second image after its display position is changed. In the example illustrated in FIG. 10, the display positions of the reference image 80B set as a second image and the reference image 80C that is not set as a second image are changed.

In the example illustrated in FIG. 11, the reference image 80B set as a second image is moved to a display position in the display region 55 at which no reference images 80 are displayed.

When changing the display position of the reference image 80B set as a second image, the display control unit 354 selects a display position in the display region 55 at which no other reference images 80 are displayed and causes the reference image 80B to be displayed at the selected display position. In the example illustrated in FIG. 11, since no other reference images 80 are displayed on the right side and the lower side of the reference image 80A that is a first image when viewed from the user U, the display control unit 354 causes the reference image 80B to be displayed on any one of the right side and the lower side of the reference image 80A.

In addition, priority may be set to display positions at which the reference images 80 are to be displayed.

The priority of the display positions is information included in the setting information 345 and is set by the user U in advance. The priority of the display positions is, for example, a setting of priority of the four directions including the upper side, the lower side, the left side, and the right side of the reference image 80 set as a first image. For example, it is assumed that, with respect to the priority of the display positions, the lower side of the reference image 80 viewed from the user U is set as the first priority and the left side of the reference image 80 is set as the second priority. In addition, it is assumed that, with respect to the priority of the display positions, the right side of the reference image 80 is set as the third priority and the upper side of the reference image 80 is set as the fourth priority.

In the example illustrated in FIG. 9, there are spaces in which no reference image 80 is displayed on the lower side and the right side of the reference image 80A that is the first image when viewed from the user U. Among the lower side of the reference image 80A and the right side of the reference image the display control unit 354 puts a higher priority of the display position to the lower side of the reference image 80A. For this reason, the display control unit 354 causes the reference image 80B set as a second image to be displayed on the lower side of the reference image 80A that is the first image.

In addition, when a plurality of reference images 80 are set as second images, priority may be given to the plurality of reference images 80. The display control unit 354 changes the display positions of the plurality of reference images 80 set as second images based on the priority of the reference images 80 and the priority of the display positions.

With respect to the priority of the reference images for example, among the plurality of reference images 80 set as the second images, the reference image 80 having the highest number of visual recognition times may be set to have the highest priority. In addition, among the plurality of reference images 80 set as the second images, the reference image 80 visually recognized last by the user U within a unit time may be set to have the highest priority.

When the display positions of the plurality of reference images 80 are to be changed, the display control unit 354 causes the reference image 80 set to have a higher priority to be displayed at the display position set to have a higher priority based on the priority of the reference images 80 and the priority of the display positions.

Figure 12:
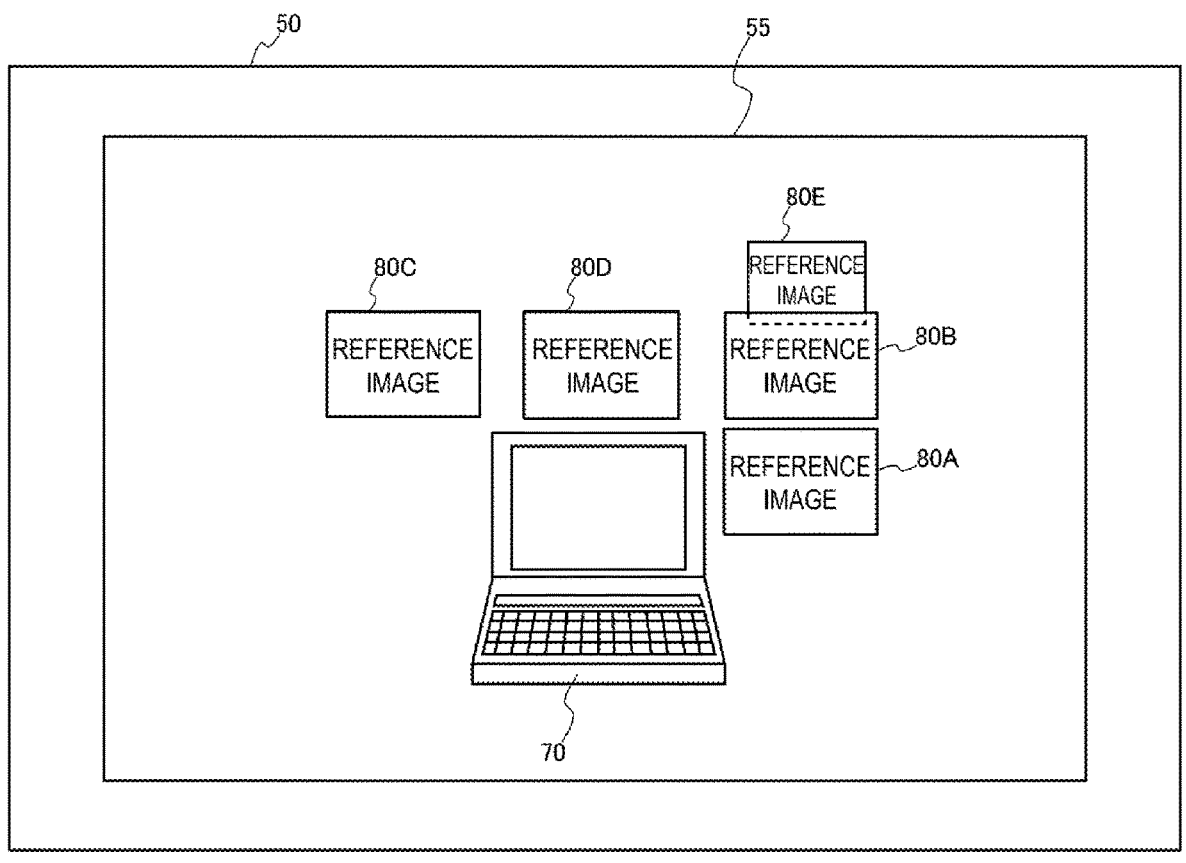
FIG. 12 is a diagram illustrating the reference images after their display positions are changed.

FIG. 12 is a diagram illustrating changed display positions of a plurality of reference images 80 when the plurality of reference images 80 are set as second images. For example, it is assumed that the reference image 80B and the reference image 80E are set as second images. In addition, the priority of the reference image 80 is given to the reference image 80B and the reference image 80E that are set as second images, and the priority of the reference image 80B is set to be higher than the priority of the reference image 80E. Furthermore, it is assumed that the priority is given to the display positions and the upper side of the reference image 80A that is set as the first image is set to have the first priority.

In this case, the display control unit 354 changes the display positions of the reference images 80B and 80E set as the second images to the upper side of the reference image 80A having the first priority for the display position. At this time, since the reference image 80B has the higher priority than the reference image 80E in terms of the priority of the reference images 80, the display control unit 354 causes the reference image 80B to be displayed in front of the reference image 80E in the Y-axis direction. In other words, the display control unit 354 causes the reference image 80E to be displayed behind the reference image 80B in the Y-axis direction. In addition, the display control unit 354 causes the reference image 80C to be displayed at the display position at which the reference image 80B or the reference image 80E was displayed.

5. Operation of Control Device

Figure 13:
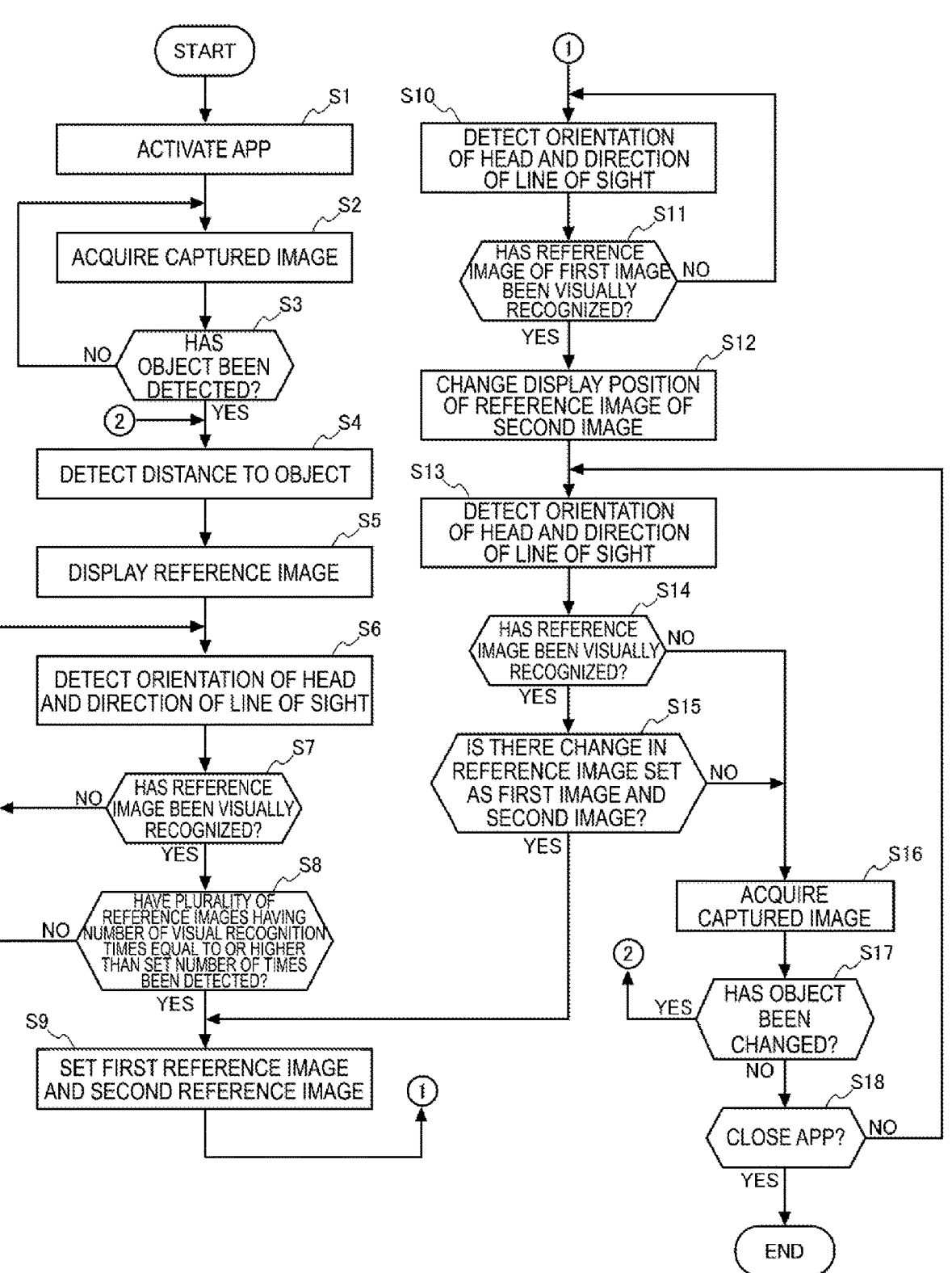
FIG. 13 is a flowchart showing an operation of a control device.

FIG. 13 is a flowchart showing an operation of the control device 300.

The operation of the control device 300 will be described with reference to the flowchart shown in FIG. 13.

First, when the control device 300 is coupled to the coupling device 10 and receives an activation operation of the APP 342, the CO control unit 330 activates the APP342 for which the activation operation has been received (step S1). Next, the CO control unit 330 acquires an image captured by the DP outer camera 61 from the memory 340 (step S2).

The CO control unit 330 analyzes the acquired captured image to detect the object 70 (step S3). The CO control unit 330 detects the object 70 by determining whether the object image 343 is included in the captured image by using pattern matching between feature points included in the object image 343 and those included in the captured image. When the object 70 is not able to be detected from the captured image (NO in step S3), the CO control unit 330 returns to step S2 and acquires the next captured image from the memory 340.

When the object 70 is detected from the captured image (YES in step S3), the CO control unit 330 detects the distance to the detected object 70 (step S4). The CO control unit 330 detects the distance from the HMD 100 to the object 70 based on the sensor data indicating a measurement result of the distance sensor 64. In addition, when the DP outer camera 61 is a stereo camera, the CO control unit 330 may perform such detection based on a captured image of the DP outer camera 61.

Next, the CO control unit 330 causes the image display unit 20 to display a plurality of reference images 80 in the display region 55 based on the detected distance to the object 70 (step S5). The CO control unit 330 adjusts the display position of the reference image 80 in the Y-axis direction so that the distance from the HMD 100 to the object 70 and the distance from the HMD 100 to the reference image 80 are equal or substantially equal in the Y-axis direction.

Next, the CO control unit 330 detects the orientation of the head of the user U based on the sensor data of the DP six-axis sensor 235, and analyzes the image captured by the DP inner camera 63 to detect the direction of the line of sight of the user U (step S6).

Next, the CO control unit 330 determines whether the user U has visually recognized the reference image 80 based on at least one of the detected orientation of his or her head and the detected direction of the line of sight (step S7). If it is determined that the user U has not visually recognized the reference image 80 (NO in step S7), the CO control unit 330 returns to the processing of step S6.

In addition, if it is determined that the user U has visually recognized the reference image 80 (YES in step S7), the CO control unit 330 determines whether a plurality of reference images 80 having the number of visual recognition times of the user U equal to or higher than the set number of times have been detected (step S8).

If a plurality of reference images 80 having the number of visual recognition times equal to or higher than the set number of times have not been detected (NO in step S8), the CO control unit 330 returns to the processing of step S6. If a plurality of reference images 80 having the number of visual recognition times equal to or higher than the set number of times have been detected (YES in step S8), the CO control unit 330 sets a first image and a second image from among the plurality of reference images 80 (step S9).

The CO control unit 330 sets the reference image 80 having the highest number of visual recognition times as a first image among the reference images 80 having the number of visual recognition times equal to or higher than the set number of times. In addition, the CO control unit 330 sets the reference images 80 other than the reference image 80 set as the first image as a second image. When a plurality of reference images 80 are set as second images, the CO control unit 330 may give priority to each of the reference images 80 based on the number of times that each reference image 80 set as a second image is referred to.

Next, the CO control unit 330 detects the orientation of the head of the user U and the line-of-sight direction of the user U again as in step S6 (step S10). The CO control unit 330 determines whether the user U has visually recognized the reference image 80 set as the first image based on at least one of the detected orientation of the head of the user U and the detected line-of-sight direction (step S11).

If it is determined that the user U has not visually recognized the reference image 80 set as the first image (NO in step S11), the CO control unit 330 returns to the processing of step S10.

In addition, if it is determined that the user U has visually recognized the reference image 80 set as the first image (YES in step S11), the CO control unit 330 changes the display position of the reference images 80 set as the second images (step S12). For example, the CO control unit 330 changes the display position of the second image when the distances to the reference images 80 set as the first image and the second image are longer than a preset distance or when the reference images 80 set as the first image and the second image are displayed on both sides above and below the object 70 or both left and right sides of the object 70, sandwiching the object 70 therebetween. For example, when the reference images 80 set as the first image and the second image are displayed on both left and right sides of the object 70 as viewed from the user U, the display position of the reference image 80 set as the second image is displayed on the same side as the reference image 80 set as the first image.

Thereafter, the CO control unit 330 detects the orientation of the head of the user U and the direction of the line of sight of the user U again (step S13) as in step S6, and determines whether the user U has visually recognized the reference images 80 (step S14). If it is determined that the user U has not visually recognized the reference images 80 (NO in step S14), the CO control unit 330 transitions to the processing of step S16.

In addition, if the user U has visually recognized the reference image s80 (YES in step S14), the CO control unit 330 determines whether there is a change in at least one of the reference images 80 set as the first image and the second image (step S15). If there is no change in the reference images 80 set as the first image and the second image (NO in step S15), the CO control unit 330 acquires an image captured by the DP outer camera 61 from the memory 340 (step S16). In addition, if the user U has not visually recognized the reference images 80 (NO in step S14), the CO control unit 330 likewise acquires an image captured by the DP outer camera 61 from the memory 340 (step S16). The CO control unit 330 analyzes the acquired captured image and determines whether the object 70 visually recognized by the user U has been changed (step S17).

If the object 70 visually recognized by the user U has not been changed (NO in step S17), the CO control unit 330 determines whether an end operation for ending the APP 342 has been received (step S18). If no ending operation of the APP 342 has been received (NO in step S18), the CO control unit 330 returns to the processing of step S13. In addition, if an ending operation of the APP 342 has been received (YES in step S18), the CO control unit 330 ends the processing flow.

If it is determined that there is a change in at least one of the reference images 80 set as the first image and the second image (YES in step S15), the CO control unit 330 proceeds to the processing of step S9 and sets a first image and a second image again. Then, the CO control unit 330 repeats the processing from step S10. In addition, if the object 70 visually recognized by the user U has been changed (YES in step S17), the CO control unit 330 returns to the processing of step S4 and detects the distance to the object 70 (step S4).

6. Summary of Present Disclosure

Summaries of the present disclosure are appended as follows.

Appendix 1

A control device configured to control a head-mounted display device mounted on the head of a user and including a display unit configured to display an image of an outside view so as to be visually recognized, the control device including:

a first detection unit configured to detect a direction of a line of sight of the user;

a second detection unit configured to detect an orientation of the head of the user;

a determination unit configured to determine, based on at least one of the line of sight of the user or the orientation of the head of the user, an image visually recognized by the user from among a plurality of images displayed by the display unit;

a setting unit configured to set, as a first image, an image with the highest number of times determined by the determination unit to be the image visually recognized by the user among a plurality of the images displayed by the display unit, and set, as a second image, an image with the second highest number of times determined by the determination unit to be the image visually recognized by the user after the first image; and a display control unit configured to change a display position of the second image so that a display distance that is a distance on the display between the first image and the second image is smaller than a preset distance.

According to this configuration, the display position of the second image is changed so that the distance between the first image and the second image becomes shorter than the preset distance. Thus, the movement distance of the line of sight of the user is shortened, and thus the burden on the user can be reduced.

Appendix 2

The control device described in Appendix 1, wherein the setting unit counts, for each of the plurality of images, the number of determination times per unit time that the determination unit determined to be the image visually recognized by the user, sets, as the first image, an image with the number of determination times per unit time equal to or greater than a preset number of times and with the highest number of determination times per unit time, and sets, as the second image, an image with the number of determination times per unit time equal to or greater than the preset number of times, the image being other than the image set as the first image.

According to this configuration, the number of determination times is counted for each unit time, and thus the first image and the second image can be changed every unit time. As a result, the first image and the second image can be changed in accordance with the use situation of the user.

Appendix 3

The control device described in Appendix 1 or 2, wherein the display control unit changes the display position of the second image so that the display distance between the first image and the second image is smaller than the set distance when the display distance that is the distance on the display between the first image and the second image is greater than the set distance.

According to this configuration, when the display distance between the first image and the second image is longer than the preset distance, the display position of the second image is changed so that the display distance between the first image and the second image becomes shorter than the set distance. Thus, the movement distance of the line of sight of the user is shortened, and thus the burden on the user can be reduced.

Appendix 4

The control device described in any one of Appendix 1 to Appendix 3, including a storage unit configured to store setting information configured to set a priority of the display position of the second image with respect to the display position of the first image, wherein the display control unit changes the display position of the second image based on the display position of the first image and the setting information.

According to this configuration, the display position of the second image is changed based on the display position of the first image and the setting information. Thus, the second image can be displayed at a position with higher priority.

Appendix 5

The control device described in any one of Appendix 1 to Appendix 4, including:

an imaging unit configured to capture an image of an outside view; and a third detection unit configured to detect an object visually recognized by the user from a captured image generated by the imaging unit, wherein the display control unit changes the display position of the second image so that the second image is displayed on a same side as the first image when the first image and the second image are displayed on both sides of the object, that is both above and below the object or both left and right of the object.

According to this configuration, the second image is displayed on the same side as the first image. As a result, the movement distance of the line of sight of the user when he or she works on the object becomes shorter, and thus workability can be improved.

Appendix 6

The control device described in Appendix 5, wherein the display unit displays an image associated with the object detected by the third detection unit.

According to this configuration, the user can work on the object while visually recognizing the displayed image, and thus workability can be improved.

Appendix 7

The control device described in Appendix 5 or 6, including a fourth detection unit configured to detect a distance to the object, wherein the display unit displays a plurality of images at positions corresponding to the distance detected by the fourth detection unit.

According to this configuration, the object and the plurality of images are displayed at the same distance from the head-mounted display device, and thus the amount of movement of the line of sight of the user can be decreased and the burden on the user can be reduced.

Appendix 8

The control device according to any one of Appendix 1 to Appendix 7, wherein the determination unit is configured to determine whether or not the user visually recognized an image by changing a direction of a line of sight while rotating the head, the setting unit is configured to generate a counting table in which a count value is registered, the count value being obtained by counting the number of times that the user visually recognized an image of the plurality of images, and a value to be added to the count value, in the counting table, corresponding to the image visually recognized by the user when the user visually recognized the image by changing the direction of the line of sight while rotating the head is set to be greater than a value to be added to the count value, in the counting table, corresponding to the image visually recognized by the user when the user visually recognized the image by changing the direction of the line of sight without rotating the head.

According to this configuration, it is possible to set a probability that the image visually recognized by the user changing the direction of the line of his or her sight while rotating his or her head will be selected as a first image or a second image to be higher than that of the image visually recognized by the user changing the direction of the line of his or her sight without rotating his or her head.

As a result, the display position of the image visually recognized by the user while rotating his or her head can be changed.

Appendix 9

A control method for a head-mounted display device mounted on the head of a user and including a display unit configured to display an image of an outside view so as to be visually recognized, the control method including:

a first step of detecting a direction of a line of sight of the user;

a second step of detecting an orientation of the head of the user;

a third step of determining, based on at least one of the line of sight of the user or the orientation of the head of the user, an image visually recognized by the user from among a plurality of images displayed by the display unit;

a fourth step of setting, as a first image, an image with the highest number of times determined in the third step to be the image visually recognized by the user among a plurality of the images displayed by the display unit, and setting, as a second image, an image with the second highest number of times determined in the third step to be the image visually recognized by the user after the first image; and a fifth step of changing a display position of the second image so that a display distance that is a distance on the display between the first image and the second image is smaller than a preset distance.

According to this configuration, the display position of the second image is changed so that the display distance between the first image and the second image becomes shorter than the set distance. Thus, the movement distance of the line of sight of the user is shortened, and thus the burden on the user can be reduced.

Appendix 10

A non-transitory computer-readable storage medium storing a program executed by a computer mounted in a control device, the control device being configured to control a head-mounted display device mounted on the head of a user and including a display unit configured to display an image of an outside view to be visually recognized, the program causing the computer to perform:

a first procedure of detecting a direction of a line of sight of the user;

a second procedure of detecting an orientation of the head of the user;

a third procedure of determining, based on at least one of the line of sight of the user or the orientation of the head of the user, an image visually recognized by the user from among a plurality of images displayed by the display unit;

a fourth procedure of setting, as a first image, an image with the highest number of times determined in the third step to be the image visually recognized by the user among a plurality of the images displayed by the display unit, and setting, as a second image, an image with the second highest number of times determined in the third step to be the image visually recognized by the user after the first image; and a fifth procedure of changing a display position of the second image so that a display distance that is a distance on the display between the first image and the second image is smaller than a preset distance.

According to this configuration, the display position of the second image is changed so that the display distance between the first image and the second image becomes shorter than the set distance. Thus, the movement distance of the line of sight of the user is shortened, and thus the burden on the user can be reduced.

The present disclosure is not limited to the configurations in the exemplary embodiments described above, and can be implemented in various modes without departing from the gist of the disclosure.

For example, although the display system 1 in which the HMD 100 and the control device 300 are separated bodies is exemplified in the above-described embodiments, the display system 1 is not limited thereto. For example, the HMD 100 may have a configuration in which the control device 300 is built therein. That is, the coupling device 10 may operate as the control device 300.

In addition, although the configuration in which the image display unit 20 and the coupling device 10 are separated is exemplified in the above-described embodiments, the coupling device 10 and the image display unit 20 may be integrated and mounted on the head of the user U. In addition, the optical system of the image display unit 20 may adopt an arbitrary configuration, and for example, an optical member that is positioned in front of the eyes of the user U and partially or entirely overlaps the field of view of the user U may be used. Alternatively, a scanning optical system that scans laser light or the like to form image light may be employed. Alternatively, the optical member is not limited to one guiding image light inside the optical member, and may be one having only a function of refracting or reflecting image light to guide the image light toward the eyes of the user U.

In addition, the coupling device 10 of the HMD 100 illustrated in FIG. 3 may be configured by using, for example, a USB-TypeC connector, a USB-TypeC controller, and a USB hub. In this case, the DP outer camera 61 and other sensors may be coupled to the USB hub. In addition, as a controller that controls display of the right display part 22 and the left display part 24 of the image display unit 20, an FPGA that outputs display data to the right display part 22 and the left display part 24 may be disposed in either the right display part 22 or the left display part 24. In this case, the coupling device 10 may include a bridge controller that couples the USB-TypeC controller and the FPGA. In addition, the DP six-axis sensor 235, the DP geomagnetic sensor 237, the EEPROM 215, and the like may be mounted on the same substrate as the FPGA in the image display unit 20. The arrangement of other sensors can also be changed as appropriate. For example, the distance sensor 64 or the DP illuminance sensor 65 may be disposed at a position suitable for measurement or detection and coupled to the FPGA or the USBType-C controller.

In addition, there is no specific restriction on the specifications of the image display unit 20 including the OLED units 221 and 241. For example, the OLED units 221 and 241 may have a common configuration.

Furthermore, each of the functional units of the HMD 100 illustrated in FIG. 3 and the control device 300 illustrated in FIG. 4 indicates a functional configuration, and a specific implementation thereof is not particularly limited. In other words, hardware that corresponds individually to each of the functional units is not necessarily implemented, and a configuration in which a single processor executes a program to realize the functions of a plurality of functional units is of course adoptable. Furthermore, some of the functions realized by software may be realized by hardware, or some of the functions realized by hardware may be realized by software in the above-described embodiments. In addition, specific detailed configurations of other parts of the projector may be modified as desired without departing from the gist of the present disclosure.

In addition, the processing unit of the flowchart shown in FIG. 13 is set by dividing the processing according to the main processing content in order to facilitate understanding of the processing in the control device 300. The present disclosure is not limited by the way of dividing the processing unit shown in the flowchart of FIG. 13 or the name of the processing. In addition, the processing of the control device 300 can be divided into more processing units in accordance with the processing content, and can be divided such that one processing unit includes more processing operations. Furthermore, the order of processing operations of the above-described flowchart is also not limited to the illustrated example.

In addition, although a first image and a second image are determined based on the number of times that the determination unit 355 determines that an image is one visually recognized by the user U per unit time in the above-described embodiment, a first image and a second image may be determined in consideration of a movement angle of the line of sight of the user U or an angular velocity which is a movement speed of the line of his or her sight.

In addition, a line-of-sight direction of the user U and the position of a gaze point at which the user U gazes in the depth direction may be detected from an image captured by the DP inner camera 63. The CO control unit 330 detects each of a line-of-sight direction of the left eye and a line-of-sight direction of the right eye as line-of-sight directions of both eyes of the user U. The CO control unit 330 detects the position of the gaze point in the depth direction from the point at which the line-of-sight direction of the left eye intersects the line-of-sight direction of the right eye. The point at which the line-of-sight direction of the left eye intersects the line-of-sight direction of the right eye corresponds to the position of the gaze point in the depth direction. The CO control unit 330 calculates the position of the image to be recognized by the user U in the depth direction based on the detected position of the gaze point in the depth direction, calculates the parallax of binocular vision so that a virtual image can be seen at the calculated position in the depth direction, and transmits the right and left images with the parallax to the HMD 100. In addition, the CO control unit 330 changes the display position of the second image including the position of the gaze point in the depth direction so that the display distance between the first image and the second image becomes shorter than the set distance.

In addition, when the determination unit 355 determines that the reference image 80 has been referred to, the setting unit 356 may change an addition value to be added to the number of visual recognition times in the visual recognition times table 344 when the user U has visually recognized the reference image 80 by changing the direction of the line of his or her sight while rotating his or her head and when the user U has visually recognized the reference image 80 by changing the direction of the line of his or her sight without rotating his or her head.

For example, when the user U has visually recognized the reference image 80 by changing the direction of the line of his or her sight while rotating his or her head, the setting unit 356 adds a value "2" to the number of visual recognition times of the visual recognition times table 344, and when the user has visually recognized the reference image 80 by changing the direction of the line of his or her sight without rotating his or her head, the setting unit 356 adds a value "1" to the number of visual recognition times of the visual recognition times table 344.

As a result, it is possible to increase the probability that the reference image 80 referred to by the user U changing the direction of the line of his or her sight while rotating his or her head will be selected as a first image or a second image.

What is claimed is:

1. A control device configured to control a head-mounted display device mounted on the head of a user and including a display unit configured to display a plurality of images to be seen as superimposed on an outside view, the control device comprising:

a first detection unit configured to detect a direction of a line of sight of the user;

a second detection unit configured to detect an orientation of the head of the user;

a determination unit configured to determine, based on at least one of the line of sight of the user or the orientation of the head of the user, an image visually recognized by the user from among the plurality of images currently displayed on the display unit to be seen as superimposed on the outside view;

a setting unit configured to set, as a first image, an image that is visually recognized by the user for the highest number of times among the plurality of images currently displayed on the display unit, and set, as a second image, an image that is visually recognized by the user for the second highest number of times; and a display control unit configured to change a display position of the second image to be closer to a display position of the first image so that a display distance between the first image and the second image is smaller than a preset distance.

2. The control device according to claim 1, wherein the setting unit counts, for each of the plurality of images, a number of determination times per unit time that the determination unit determined to be the image visually recognized by the user, sets, as the first image, an image that is visually recognized by the user for the highest number of times with the number of determination times per unit time equal to or greater than a preset number of times, and sets, as the second image, an image that is visually recognized by the user for the second highest number of times with the number of determination times per unit time equal to or greater than the preset number of times.

3. The control device according to claim 1, wherein the display control unit changes the display position of the second image so that the display distance between the first image and the second image is smaller than the preset distance when the display distance before the change is greater than the preset distance.

4. The control device according to claim 1, comprising a storage unit configured to store setting information configured to set a priority of the display position of the second image with respect to the display position of the first image, wherein the display control unit changes the display position of the second image based on the display position of the first image and the setting information.

5. The control device according to claim 1, comprising:
an imaging unit configured to capture an image of an outside view; and
a third detection unit configured to detect an object visually recognized by the user from a captured image generated by the imaging unit, wherein the display control unit changes the display position of the second image so that the second image is displayed on a same side as the first image when the first image and the second image are displayed on both sides of the object, that is both above and below the object or both left and right of the object.

6. The control device according to claim 5, wherein the display unit displays an image associated with the object detected by the third detection unit.

7. The control device according to claim 5, comprising a fourth detection unit configured to detect a distance to the object, wherein the display unit displays the plurality of images at positions corresponding to the distance detected by the fourth detection unit.

8. The control device according to claim 1, wherein the determination unit is configured to determine whether or not the user visually recognized an image by changing a direction of a line of sight while rotating the head, the setting unit is configured to generate a counting table in which a count value is registered, the count value being obtained by counting the number of times that the user visually recognized an image of the plurality of images, and
a value to be added to the count value, in the counting table, corresponding to the image visually recognized by the user when the user visually recognized the image by changing the direction of the line of sight while rotating the head is set to be greater than a value to be added to the count value, in the counting table, corresponding to the image visually recognized by the user when the user visually recognized the image by changing the direction of the line of sight without rotating the head.

9. The control device according to claim 1, wherein when the line of sight of the user is directed to a respective image currently displayed on the display unit for a preset time or longer, increase a counter counting the number of times the respective image is visually recognized, by 1, and each of the plurality of images currently displayed on the display unit has the respective counter.

10. A control method for a head-mounted display device mounted on the head of a user and including a display unit configured to display a plurality of images to be seen as superimposed on an outside view, the control method comprising:
a first step of detecting a direction of a line of sight of the user;
a second step of detecting an orientation of the head of the user;
a third step of determining, based on at least one of the line of sight of the user or the orientation of the head of the user, an image visually recognized by the user from among the plurality of images currently displayed on the display unit to be seen as superimposed on the outside view;
a fourth step of
setting, as a first image, an image that is visually recognized by the user for the highest number of times among the plurality of images currently displayed on the display unit, and
setting, as a second image, an image that is visually recognized by the user for the second highest number of times; and
a fifth step of changing a display position of the second image to be closer to a display position of the first image so that a display distance between the first image and the second image is smaller than a preset distance.

11. A non-transitory computer-readable storage medium storing a program executed by a computer mounted in a control device,
the control device being configured to control a head-mounted display device mounted on the head of a user and including a display unit configured to display a plurality of images to be seen as superimposed on an outside view,
the program causing the computer to perform:
a first procedure of detecting a direction of a line of sight of the user;
a second procedure of detecting an orientation of the head of the user;
a third procedure of determining, based on at least one of the line of sight of the user or the orientation of the head of the user, an image visually recognized by the user from among the plurality of images currently displayed on the display unit to be seen as superimposed on the outside view;
a fourth procedure of setting, as a first image, an image that is visually recognized by the user for the highest number of times among a plurality of the images currently displayed on the display unit, and
setting, as a second image, an image that is visually recognized by the user for the second highest number of times; and
a fifth procedure of changing a display position of the second image to be closer to a display position of the first image so that a display distance between the first image and the second image is smaller than a preset distance.

* * * * *